(12) United States Patent
Niwa

(10) Patent No.: US 6,397,111 B1
(45) Date of Patent: May 28, 2002

(54) NUMERICALLY CONTROLLED MACHINE TOOL AND METHOD

(75) Inventor: Tomomitsu Niwa, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1440 days.

(21) Appl. No.: 08/668,718

(22) Filed: Jun. 24, 1996

Related U.S. Application Data

(60) Continuation of application No. 08/429,784, filed on Apr. 27, 1995, now abandoned, which is a division of application No. 08/174,699, filed on Dec. 28, 1993.

(30) Foreign Application Priority Data

Dec. 28, 1992 (JP) .............................................. 4-348781
Mar. 25, 1993 (JP) .............................................. 5-066626

(51) Int. Cl.[7] .......................... G05B 11/01; G06F 19/00
(52) U.S. Cl. .......................... 700/11; 700/169; 700/174
(58) Field of Search .................................. 318/567, 568; 700/11–13, 19, 20, 23, 86, 87, 169, 173, 174, 179, 182

(56) References Cited

U.S. PATENT DOCUMENTS

| | | | | |
|---|---|---|---|---|
| 3,909,923 A | * | 10/1975 | Kurimoto | 29/568 |
| 4,501,998 A | * | 2/1985 | Nozawa et al. | 318/568 |
| 4,628,444 A | * | 12/1986 | Nozawa et al. | 364/188 |
| 4,706,373 A | * | 11/1987 | Andrivssi | 29/568 |
| 4,835,730 A | * | 5/1989 | Shimano et al. | 364/513 |
| 5,128,857 A | * | 7/1992 | Okada et al. | 364/140 |
| 5,181,178 A | * | 1/1993 | Sasaki et al. | 364/474.14 X |
| 5,229,950 A | * | 7/1993 | Niwa | 364/474.23 |
| 5,488,564 A | * | 1/1996 | Ikeda | 364/474.16 |

FOREIGN PATENT DOCUMENTS

FR  2558277  7/1985

\* cited by examiner

Primary Examiner—William Grant
Assistant Examiner—Elliot Frank
(74) Attorney, Agent, or Firm—Sughrue Mion, PLLC

(57) ABSTRACT

A numerically controlled machine tool which allows the automatic generation of a restoring program for carrying out processing required for the resumption of an NC machining program to resume the execution of the NC machining program after the execution of the NC machining program has been stopped and interrupt processing has been performed. Specifically, even for nesting programs, when the machining program is re-executed from where it had stopped after the execution of the machining program has stopped and the operator has performed optional interrupt processing, the stop-time and re-execution-time machine statuses are compared to automatically generate the restoring program so that the machine status may be returned to the stop-time status, whereby the operator can perform the resumption processing of the machining program without any restrictions.

10 Claims, 26 Drawing Sheets

FIG. 3

| |
|---|
| AXIS COORDINATE VALUES ~141 |
| USED TOOL NUMBER ~142 |
| COMPENSATION COMMAND VALUE ~143 |
| FEEDRATE ~144 |
| SPINDLE SPEED ~145 |
| G COMMAND MODAL VALUE ~146 |
| M COMMAND STATUS ~147 |

FIG. 2

| |
|---|
| STOP POSITION ~131 |
| MAIN PROGRAM POSITION ~132 |
| NUMBER OF MAIN PROGRAM EXECUTION TIMES ~133 |
| SUBPROGRAM BEGINNING POSITION NO.1 ~134 |
| SUBPROGRAM POSITION NO.1 ~135 |
| NUMBER OF SUBPROGRAM EXECUTION TIMES NO.1 ~136 |
| ⋮ |
| SUBPROGRAM BEGINNING POSITION NO.n ~134 |
| SUBPROGRAM POSITION NO.n ~135 |
| NUMBER OF SUBPROGRAM EXECUTION TIMES NO.n ~136 |

FIG. 6

M COMMAND TABLE

| M COMMAND | GROUP | COMPLETION UNREQUIRED | TEST LOCK | FORCED OUTPUT | COMMENT |
|---|---|---|---|---|---|
| 3 | 1 | | * | * | SPINDLE FORWARD |
| 4 | 1 | | | * | SPINDLE REVERSE |
| 5 | 1 | | | * | SPINDLE STOP |
| 6 | | | | * | TOOL CHANGE |
| 7 | 2 | * | * | | MIST COOLANT ON |
| 8 | 2 | * | * | | LIQUID COOLANT ON |
| 9 | 2 | * | | | COOLANT OFF |
| ..... | | | | | |

FIG. 9A

STOP INFORMATION ~171

| | | | |
|---|---|---|---|
| MAIN | P: 100 ~175<br>S: 2700 ~176<br>B: 2 ~177<br>23/150 ~178 | | |
| SUB1 | P: 100 ~179<br>S: 5100 ~180<br>B: 0 ~181 | P: 100 ~175<br>S: 5170 ~176<br>B: 1 ~177<br>7/10 ~178 | |
| SUB2 | P: 100 ~179<br>S: 7800 ~180<br>B: 0 ~181 | P: 100 ~175<br>S: 7835 ~176<br>B: 3 ~177<br>3/5 ~178 | |

~172 ~173 ~174

X: 15763  ~182
Y: 4002
Z: -7000
C: 0

T: 17  ~183
H: 2
F: 7000
S: 3500

G: 1,······  ~184

~170

~185

| M ~186 | ~187 SPINDLE FORWARD<br>LIQUID COOLANT ON<br>······ |
|---|---|
| 3<br>8<br>····· | |
| 606 | 180° ARM SWING |

~188                              ~189

```
RESTORING PROGRAM

G90G0X15000Y7000Z1000;
188 ⎯ T17M06;
       S3500M03;
       M08;
       G0X-2058Y3507Z-2000;
       %
```

| 6 | TOOL CHANGE |
|---|---|
| 601 | POT TILT |
| 602 | 90° ARM SWING |
| 603 | HAND CLOSE |
| 604 | TOOL UNCLAMP |
| 605 | ARM ADVANCE |
| 606 | 180° ARM SWING |
| 607 | AIR BLOW |
| 608 | ARM RETURN |
| 609 | TOOL CLAMP |
| 610 | HAND OPEN |
| 611 | -90° ARM SWING |
| 612 | POT UPRIGHT |

FIG. 27
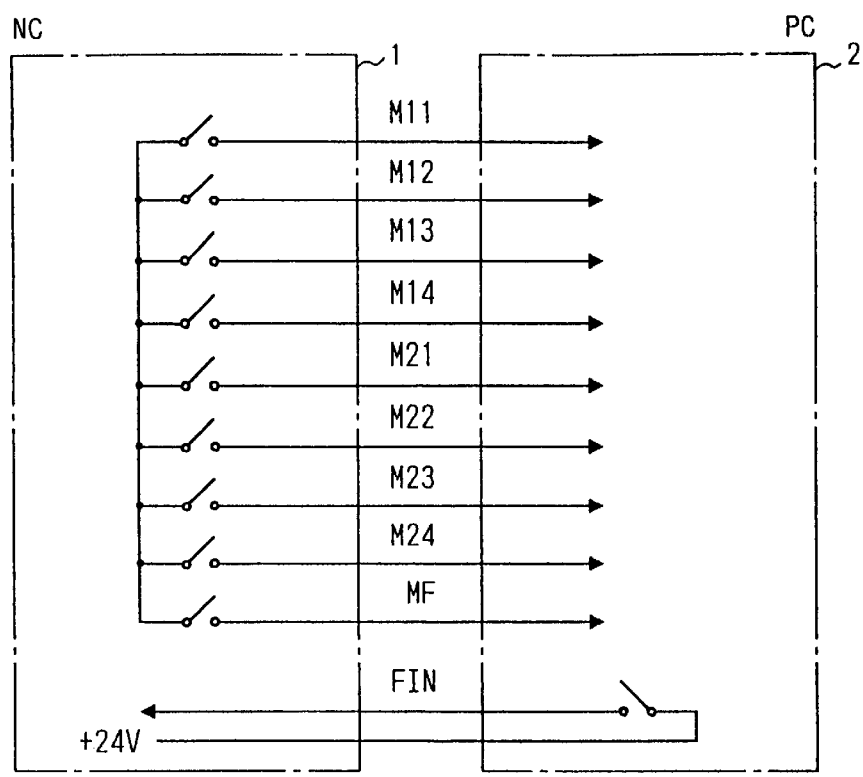
FIG. 28A
FIG. 28B
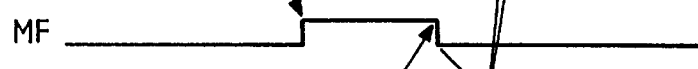
FIG. 28C
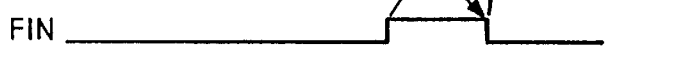
FIG. 28D

NUMERICALLY CONTROLLED MACHINE TOOL AND METHOD

This is a continuation of application Ser. No. 08/429,784 filed Apr. 27, 1995, now abandoned. This is a divisional of Application No. 08/174,688 filed Dec. 28, 1993.

BACKGROUND OF THE INVENTION

1. Field of the Invention

The present invention relates to a numerically controlled machine tool and specifically to a numerically controlled machine tool which allows a machining program to be re-executed easily after it has been stopped and which allows the machining program to be checked easily, thereby speeding up miscellaneous function processing.

2. Description of the Background Art

In recent years, machine tools using computer numerical control apparatuses with built-in computers (numerically controlled machine tools) have found widespread use in machining fields, pushing automation and labor-saving forward in these fields.

A numerically controlled machine tool consists of a computer numerical control apparatus (CNC), a power sequence circuit and a machine tool.

The power sequence circuit, which is provided between the CNC and the machine tool to do a variety of miscellaneous tasks, was ordinarily made of 200 to 300 relay circuits in the conventional art depending on a machine scale. As NC shifted from wiring logic NC to CNC, the mainstream of the power sequence circuit has changed from a relay circuit to a programmable controller (PC) using a microprocessor.

The PC is classified as either a general-purpose PC or a built-in PC dedicated to CNC. While the general-purpose PC is used with a machine tool which has several hundred tools and an auto loader and requires intricate sequences and I/O signals, the built-in PC is functional enough to be used with most machine tools.

The built-in PC for use with a lathe or a compact machining center can exhibit PC functions by utilizing the remaining capacity of a microprocessor for CNC, without an independent microprocessor being specifically prepared for the PC. In this case, the number of parts for use with the PC may be extremely small, whereby the PC achieved is excellent in both reliability and cost.

The built-in PC for use in the CNC, which can be contained in the locker of the CNC, also has an advantage that a space for installation of the PC is not required in the machine.

Data transfer between the built-in PC and the CNC is made by a common bus (or equivalent) without special drivers/receivers being required, whereby the number of I/O points required for the PC is about half that of the general-purpose PC.

Various settings (such as those of timers and counters), status display, alarm message display, etc., related to the PC can be made from the operator panel of the CNC and do not require any other operator panel. FIG. 26 is a schematic diagram of a CNC machine tool using a CNC having a built-in PC dedicated to an NC, wherein the numeral 10 indicates a CNC and 20 denotes a machine tool. The CNC 10 consists of an NC 1, a programmable controller (PC) 2 and an input/output circuit 3, and the NC 1 is made up of a man-machine controller 4 controlled by a man-machine interface between an operator 110 and the CNC machine tool, a miscellaneous command controller 5 for controlling miscellaneous commands such as M, S and T commands, and an axis movement controller 6 for controlling servo axes.

The PC 2, which stores sequence programs, is a sequence control apparatus having a structure (not shown) similar to that of a computer and consists of a CPU, a program storage device, etc., mainly semiconductor memories such as ROMs and RAMS. The I/O circuit 3 is an interface with the machine, consists of drivers and receivers, and is connected to a machine operation panel 12, a power circuit 13, a spindle amplifier 15, etc., of the machine tool 20.

The machine tool 20 has an NC operation panel 11, which acts as the center of a man-machine interface between the operator 110 and the CNC machine tool and which generally consists of a CRT device, a ten-key pad, etc. The data of the NC 1 is displayed on the CRT device and data is entered from the ten-key pad.

The machine operation panel 12 is mainly employed by the operator 110 to manually operate the machine tool, the power circuit 13 controls the actuators, etc., of machine components 14, the spindle amplifier 15 controls a spindle motor 16, and a velocity control unit 17 controls a feed motor 18.

In addition to its essential task, i.e., machining such as cutting and grinding, the machine tool has auxiliary tasks to carry out said machining, for example, workpiece loading/unloading, spindle motor start/stop, cutting oil on/off, and tool selection.

These auxiliary tasks are processed by the PC 2 in response to miscellaneous function signals (M commands), tool select signals (T commands), etc., transmitted from the NC 1.

FIG. 27 illustrates a miscellaneous function signal interface, wherein any of two-digit BCD code signals (M11 to M24) and a code reading signal (MF) are transmitted from the NC 1 to the PC 2, this code signal is decoded by the PC 2, required actuators are driven in a predetermined sequence, and operations commanded are performed.

When the operations are complete, a completion signal (FIN) is sent to the NC 1. Receiving the FIN signal, the NC 1 switches off the code reading signal MF. Subsequently, the NC 1 switches the completion signal FIN off, then the M code signal off, and the processing progresses to an NC command in a next block. The timing chart of this operation is shown in FIG. 28.

FIG. 29 is a flowchart showing a sequence of operations from the creation of a machining program to the inspection of a workpiece. While simultaneously looking at a machining drawing 100, a programmer 101 writes an NC machining program (step 102). The machining program is written in a general EIA format, a CNC-loaded automatic program often used recently, offline CAM or the like. 103 indicates an NC machining program written as described above.

When the creation of the machining program is complete, the machining program 103 is checked (step 104). This check can be performed by displaying the locus of a machining path on a screen since many of recent CNCs are capable of graphic display, etc. When the machining program 103 seems to be correct, the machine tool is operated without actual machining being carried out, thereby performing a non-cutting operation in which the machining program is checked while simultaneously the operation of the machine tool is confirmed (step 105). If cutting seems to be done without fault, trial machining is carried out actually (step 106). If correct cutting seems to be performed, a regular cutting operation is started (step 107) and a workpiece is inspected as required (step 108). If a machining program fault has been found in any stage of steps 104 to 108, the machining program 103 is corrected (step 109), and rechecked from the required stage of steps 104 to 108. In the stage of said steps 105, 106 and 107, it may be necessary for the operator 110 to temporarily stop the execution of the machining program and perform a manual operation.

For example, the operator 110 may need to remove chips caught during cutting by performing manual operation, or needs to change a tool broken midway during operation.

FIG. 30 illustrates the internal statuses of the NC 1 and the machine tool 20 at a time when the execution of the machining program has been stopped and interruption made by manual operation, etc.

Concurrently with the analysis of the NC machining program 103 (step 111), the NC 1 outputs various commands to the machine. In response to the commands, the machine tool 20 performs predetermined operations (step 114). At this time, status A of the NC 1 matches status A of the machine tool 20. A status match in this case indicates that the status of the machine tool 20 recognized by the NC 1 matches the actual status of the machine tool 20, e.g., when the NC 1 recognizes that tool No. 7 is currently fitted to the machine tool 20, the machine tool 20 is actually fitted with tool No. 7. Further, the position of each axis of the machine tool 20 recognized by the NC 1 matches the actual position of each axis of the machine tool 20.

Machining is generally executed in accordance with the machining program 103 during the execution of the machining program 103, with the statuses of both the NC 1 and the 10 machine tool 20 matching as described above. When this execution is stopped (step 112) and the operator 110 operates the machine tool through manual operation or the like (step 113), NC status B at a stop is different from machine tool status B and NC status C after an interrupt operation is different from machine tool status C, respectively.

FIG. 31 illustrates an example of the above operation. During the execution of the machining program (107), assume that an M08 command is given. Since the M08 command is a liquid coolant ON command, liquid coolant is set to the ON status in the machine tool. This liquid coolant remains in the ON status until coolant OFF (M09 command) is provided. Supposing that the machining program is stopped in this stage (112), the execution of the machining program is stopped but the liquid coolant in the machine tool remains ON. Since it is difficult for the operator 110 to perform operation if the coolant remains ON, the operator 110 gives the M09 command by manual operation (MDI) to switch the coolant OFF (113). Receiving this M09 command, the machine tool set the coolant to the OFF status. If it is attempted to resume the machining program subsequently (118), machining will be resumed in the machine tool with the coolant remaining in the OFF status, and machining will be resumed in a status different from the stop-time status, i.e., the liquid coolant ON status.

In addition to the above example which is related to miscellaneous commands, if a tool must be moved from a stop-time tool position to enable operation, moving the tool will naturally render the tool position at the stop time (112) different from the tool position after interrupt operation (113).

FIG. 32 illustrates an operation wherein the NC machining program 103 stopped is resumed. When the NC machining program 103 is stopped once and the interrupt operation 113 is performed, the NC and machine tool statuses become different after the stop, and if the NC machining program 103 is resumed in those statuses, machining cannot be carried out without fault. For this reason, a restoring operation 117 required for resumption must be conducted. The restoring operation indicates that the machine position is returned to the stop-time position and the machine status is returned to the stop-time status (spindle rotation, coolant ON/OFF, etc.).

When the machining program is stopped to a temporary machining program stop status, e.g., a feed hold or a block stop, and is then resumed in such a status, there is no problem. However, if the execution of the machining program has been stopped completely by, for example, resetting the CNC and is then to be resumed, a function, such as a program search for finding only the position of the machining program or a modal search for finding the position of the machining program concurrently with the updating of the internal status of the CNC, must be employed to return the machining program to its beginning.

FIG. 33A shows an example of an automatic tool changer (ATC). 30 indicates an ATC stored with a plurality of replacement tools 35, 36. As also seen in FIG. 33B, 32 denotes a tool changing arm having hands 33 at both ends for gripping tools. 31 represents a spindle fitted with a machining tool 34 at a front end for machining a workpiece with said tool 34. When a tool change is made, first the replacement tool is moved to the tool changing position of the ATC 30 and the machining tool 34 is then moved to the tool changing position. This is a position where the arms 32 can change tools and is predetermined for the machine. When the machining tool 34 and the replacement tool 35 have reached the predetermined positions, a miscellaneous command for tool change (M06) is executed.

FIG. 34 is a flowchart which indicates correspondences between a series of machine operations under the command of M06 (tool change) and miscellaneous commands (M commands) corresponding to said machine operations. When M06 is executed, a tool change is completed by a series of operations as shown in FIG. 34. During the tool changing operation performed by specifying M06, some fault may take place, resulting in a failure to continue the tool changing operation. In this case, since the operator 110 must intervene to remove the fault and complete the tool change, it is general that each operation of the series of operations for tool change can be specified by a miscellaneous command (M command). Namely, it is designed to allow the operations equivalent to the M06 command to be performed by giving M601 to M612 in sequence.

Suppose that the ATC arm has been disabled from swinging due to interference with the workpiece or the like during "180° arm swing", an operation equivalent to M606 in FIG. 34. In this case, the NC machine tool cannot continue machining and the operator must intervene to remove the fault factor. For this purpose, the operator stopped the execution of the program, then removed the fault factor by manual operation, etc., observed the tool change condition to recognize that the stop had been effected during the "180° arm swing" because the tool change operation (M06) had ended.midway during the operation, and executed the M606 to M612 commands which would command the subsequent series of tool change operations to be performed by manual operation (MDI), thereby completing M06 processing.

The conventional numerically controlled machine tool arranged as described above had a first disadvantage that after the machining program 103 was stopped for some reason and interrupt processing was performed, the operator 110 had to return from the current status to the stop-time status with great trouble and time for the resumption of the machining program 103, and if machining is resumed without the correct status being restored, the machine may be damaged.

To facilitate this machining program resumption processing, Japanese Laid-Open Patent Publication No. SHO55-97606 discloses an invention wherein, if the operator 110 has moved the machining stop-time tool position by manual operation, its midway or partway path is stored and this midway or partway path stored is traced reversely at the resumption time to restore the tool to the stop position.

Further, Japanese Laid-Open Patent Publication No. SHO57-60488 and Japanese Laid-Open Patent Publication No. HEI2-151909 disclose inventions wherein a stop-time CNC status is stored and this stored CNC status is restored at a resumption time to resume machining.

However, each of these two approaches merely stores the stop-time internal status of the CNC and simply restores it at the resumption time and does not give any consideration to a resumption-time machine status. Also, each of these three approaches has restrictions on the operation between the stop and resumption of machining in order to properly resume the machining. For instance, in the invention disclosed in Japanese Laid-Open Patent Publication No. SHO55-97606, a return is always allowed only to a stop position and data stored becomes invalid when the CNC is powered down.

Also, either of the approaches disclosed in Japanese Laid-Open Patent Publication No. SHO57-60488 and in Japanese Laid-Open Patent Publication No. HEI2-151909 allows only an interrupt program preprogrammed to interrupt at a machining stop time and does not permit the operator 110 to perform an interrupt operation optionally.

As a concept which considers a resumption time for miscellaneous commands, such as M commands, there is an approach which stores miscellaneous commands executed previously and displays their data on a screen at a resumption time to assist the operator 110 in performing resumption processing, as disclosed in Japanese Laid-Open Utility Model Publication No. SHO57-78407.

Also, there is an approach that groups miscellaneous commands and displays which miscellaneous command is the one given last in each group to assist the operator 110 in writing a resumption processing program, as disclosed in Japanese Laid-Open Patent Publication No. SHO63-73401.

Further, there is an approach that groups miscellaneous commands and automatically executes the finally given miscellaneous command in each group at a resumption processing time to resume machining, as disclosed in Japanese Laid-Open Patent Publication No. HEI2-300801.

However, any of these three approaches merely updates data during the search or execution of a machining program and does not allow the resumption-time status of the machine tool to be obtained if the stop-time CNC miscellaneous command status can be obtained.

Also, the conventional machine tool had a second disadvantage that it was difficult to obtain the machine status with the machine cover closed since the current machine status cannot be identified until the actual machine is viewed.

Also, when a complicatedly structured machining program having multi-level nesting was executed and then stopped during the execution of a subprogram, it was difficult to judge at which position the machining program stopped machining. Hence, the conventional machine tool had a third disadvantage that time and labor were required to specify the program position from where machining was to be resumed, giving a burden to the operator 110.

To solve this disadvantage, Japanese Laid-Open Patent Publication No. SHO62-32505 or Japanese Laid-Open Patent Publication No. HEI2-114302 discloses a technique which displays the execution position of a nested machining program. This Japanese Laid-Open Patent Publication No. SHO62-32505 also discloses that the specified number of subprogram repetition times and the number of repetition times during execution are displayed.

However, these two techniques allow the execution position of the machining program to be recognized but do not allow this recognized position of the machining program to be specified. When the machining program was stopped during the execution of the subprogram, it was impossible to specify that position, because the conventional method of specifying the position of the machining program did not allow the position of the main program which had called the subprogram, the number of executed repetition times, etc., to be specified.

To solve this disadvantage, Japanese Laid-Open Patent Publication No. SHO60-263209 discloses a system wherein a position in a subprogram and the number of executed repetition. times are specified and searched. However, since the position of a main program that had called the subprogram cannot be specified, this system has a disadvantage that if the main program had called the same subprogram at a plurality of positions, the calling positions from the second onward cannot be searched.

Further, the system disclosed in Japanese Laid-Open Patent Publication No. SHO60-263209 has a disadvantage that much search time is required since the repetition processing of the subprogram is executed intact to make a search.

Also, the known machine tools had a further disadvantage that if a fault occurred during a series of machine operations, such as a tool change, commanded to be performed by a single miscellaneous command, it was difficult to identify the operation where the fault had taken place and further a restoring operation was difficult.

Also, the known machine tool had a another disadvantage that machining time was lost because the program advanced to the next step after the completion of a miscellaneous command if it is the one that need not be completed.

To solve this disadvantage, there is a method wherein a next block is processed without waiting for the completion signal of an M command which need not be completed, as disclosed in Japanese Laid-Open Patent Publication No. SHO62-189506. However, if the next block is simply processed without waiting for the M command as disclosed in this publication, a fault will occur in the following case and the M command cannot be executed correctly.

Namely, when the next block is executed without waiting for the completion of the M command and another M command exists in the next block, the PC will ignore the next M command or a fault may occur in the PC if the next M command is output intact to the PC, because the PC is executing the preceding M command. Assuming that the interface with the PC remains unchanged from the previous one since the publication does not describe specifically that the interface with the PC is changed, the PC is not permitted to output the next M command during the processing of the preceding M command.

Also, the known machine tool had yet another disadvantage in that the machining program was not easy to check because selection could be made from only two methods, i.e., all miscellaneous commands are executed or all miscellaneous commands are not executed (miscellaneous command lock) for non-cutting operation or the like in which the machining program was checked concurrently with the operation of the machine tool.

Further, the known machine tool had a disadvantage in that when it was attempted to check the machining program concurrently with the actual movement of the machine, there was no function appropriate for checking the program with the slight movement of the machine at any area that the machine may interfere with.

SUMMARY OF THE INVENTION

Accordingly, an object of the present invention is to overcome certain of the several disadvantages previously noted by providing a numerically controlled machine tool which allows the automatic generation of a restoring program for carrying out processing required for the resumption of an NC machining program to resume the execution of the NC machining program after the execution of the NC machining program has been stopped and interrupt processing has been performed.

Specifically, in a numerically controlled machine tool embodying the present invention, when the machining program is re-executed from where it had stopped after the execution of the machining program has stopped and the operator has performed optional interrupt processing, the stop-time and re-execution-time machine statuses are compared to automatically generate the restoring program so that the machine status may be returned to the stop-time status, whereby the operator can perform the resumption processing of the machining program without any restrictions.

Further, the stop-time status of the NC machine tool can be displayed to allow the operator to easily grasp the stop-time status of the NC machine tool, and furthermore, this status can be corrected on the screen to significantly improve flexibility at the resumption time.

Also, the operator can correct the automatically generated restoring program as appropriate to enable optimum restoring processing according to stop-time and resumption-time conditions.

Also, the M commands given are classified into groups and the M commands specified for each group are monitored to allow the machine status to be recognized, and each M command can be annotated with a comment to allow the operator to grasp the machine status easily.

Further, the number of subprogram repetition times and the number of its execution times can be corrected and even the execution position of the program can be corrected as required, whereby control can be exercised as appropriate to start a complicatedly structured machining program having multiple nesting partway through a subprogram and partway through a plurality of repetitions.

Also, if the machine has stopped halfway through a series of machine operations, at which operation of the series of machine operations the machine has stopped can be recognized and the machine can be restored easily after the stop factor has been removed.

Another object of the invention is to overcome other of the above disadvantage by providing a numerically controlled machine tool which executes a next step without waiting for the completion of a miscellaneous command which need not be completed.

Specifically, the processing immediately shifts to a next command when an M command which need not be completed is being executed, whereby the processing of the M command which need not be completed can be performed at high speed.

Also, when the next M command has been specified, the M command is always output to the PC after the previously given M command is complete, whereby the machine is applicable without requiring the interface between the conventional NC and the PC to be changed.

A further object of invention also is to overcome other noted disadvantages by providing a numerically controlled machine tool which is not limited to execute only a specific miscellaneous command if it has been specified, thereby ensuring ease of machining program check. The invention also provides a numerically controlled machine tool which executes only a specific miscellaneous command even in a miscellaneous command lock status, thereby ensuring ease of machining program check.

Specifically, according to the numerically controlled machine tool of the present invention, the M commands which are not desired to be executed are allowed to be not executed without the machining program being modified, whereby the machining program can be checked on the actual machine safely and easily.

Also, the M commands which are desired to be executed even at the miscellaneous command lock time are allowed to be executed without the machining program being modified, whereby the machining program can be checked on the actual machine easily.

A further object of the invention is to provide a numerically controlled machine tool which allows a tool to move a specified distance on a tool path specified by a machining program and come to a stop every time a travel distance is specified.

Specifically, the numerically controlled machine tool concerned with the present invention, the tool can be moved by the specified travel distance and stopped to the feed hold status, whereby the machining program can be checked easily in relation to the movement of the tool. For example, if the tool is likely to interfere with a workpiece, a tailstock or the like, whether the tool interferes or not is checked by moving the tool little by little. In such a case, the travel of actual movement can be specified optionally, whereby the operator can make a check free from care.

BRIEF DESCRIPTION OF THE DRAWINGS

FIG. 2 illustrates a table which indicates the execution position of an NC machining program.

FIG. 3 illustrates a table which indicates other information during execution.

FIG. 6 provides a screen display example for specifying the grouping of M commands.

FIG. 27 illustrates an interface for miscellaneous function signals.

FIG. 28 is a timing chart of M command processing operation.

DESCRIPTION OF THE PREFERRED EMBODIMENTS

Figure 1:
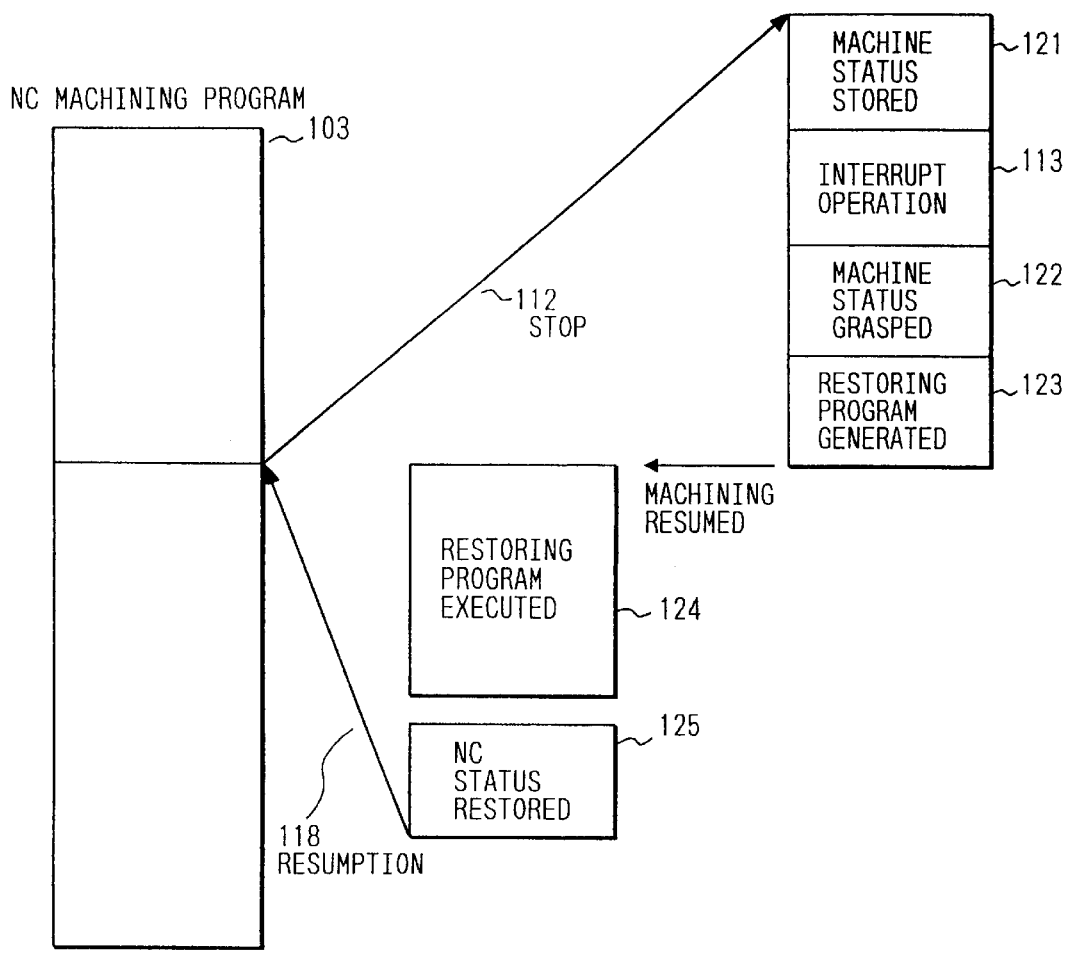
FIG. 1 illustrates a preferred embodiment of the present invention.

A numerically controlled machine tool concerned with a first embodiment will now be described. FIG. 1 illustrates the first embodiment, wherein when an NC machining program 103 is stopped (step 112), the status of the NC machine tool at that point is stored (step 121). When an operator performs an interrupt operation (step 113) and subsequently attempts to resume the NC machining program (step 118), the NC machine tool status at a resumption point is grasped (step 122) and is compared with the NC status stored at step 121, whereby a restoring program is generated (step 123). When machining is resumed (step 118), the restoring program generated at step 123 is run (step 124), the NC status stored at step 121 is then restored (step 125), and the operation subsequent to the stop of the NC machining program 103 is performed thereafter, whereby the NC machining program stopped can be resumed.

FIG. 2 illustrates a table which indicates the execution position of the NC machining program 103. The numeral 131 designates information indicating the execution position of the machining program. When a general EIA machining program is being executed, this information is a program number (O No.), a sequence number (N No.) and a block number (B). When an automatic program is being executed, that information indicates the stop position corresponding to that automatic program. 132 denotes information indicating a position on a main program and its data is similar to 131. 133 represents information indicating the numbers of main program execution times, which include the number of times when the main program must be executed essentially and the number of times the main program has been executed previously. For example, when the main program, which must be executed 100 times, was executed 56 times and was being executed at the 57th time, values stored are 100 and 56.

134 represents the beginning position of each subprogram. The beginning position denotes information indicating the beginning of the subprogram called by the main program. If said subprogram is calling another subprogram, the beginning position represents information indicating a subprogram call position. If not, the beginning position designates information indicating an execution position on said subprogram. The information 134, 135 is similar in structure to 131. As in 133, 136 denotes the number of specified repetition times and the number of previously executed times of the corresponding subprogram, e.g., when the subprogram, which had been specified to be executed 50 times repeatedly, was executed 25 times and was being executed at the 26th time, values stored are 50 and 25.

Thereafter, the information of the subprogram is stored into 134, 135 and 136 by the number of subprogram nesting times. n indicates the number of nesting times permitted for the subprogram, and the nesting information of the subprogram not executed is assumed to have been cleared to zero.

Figure 5:
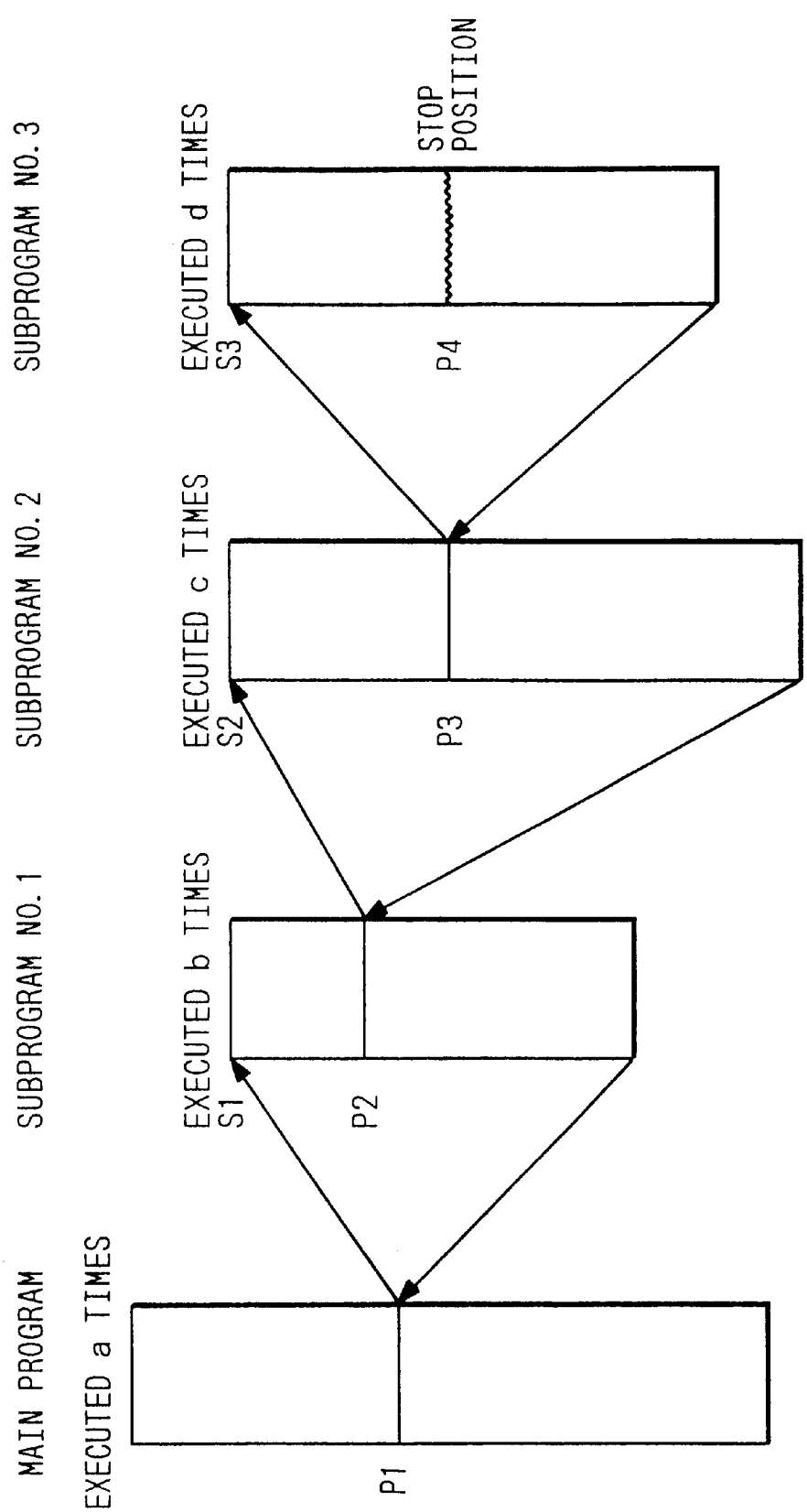
FIG. 5 gives an example showing the execution status of the NC machining program.

FIG. 5 shows an example of the execution status of the NC machining program 103. It is supposed that the main program, which must be executed A times, has been executed up to the "a"th time and is currently being executed at the "a+1"th time, subprogram 1 is called at point P1, the beginning of subprogram 1 is S1, subprogram 1, which must be executed B times, has been executed up to the "b"th time and is currently being executed at the "b+1"th time, subprogram 2 is called at point P2, the beginning of subprogram 2 is S2, subprogram 2, which must be executed C times, has been executed up to the "c"th time and is currently being executed at the "c+1"th time, subprogram 3 is called at point P3, the beginning of subprogram 3 is S3, subprogram 3, which must be executed D times, has been executed up to the "d"th time and is currently being executed at the "d+1"th time, and the execution position thereof is P4.

In this case, referring to FIG. 2:

the data of 131 is the information indicating the position of P4;

the data of 132 is the information indicating the position of P1;

the data of 133 is the information indicating A and a;

the data of 134 concerned with subprogram 1 is the information indicating the position of S1;

the data of 134 concerned with subprogram 1 is the information indicating the position of P2;

the data of 136 concerned with subprogram 1 is the information indicating B and b;

the data of 134 concerned with subprogram 2 is the information indicating the position of S2;

the data of 135 concerned with subprogram 2 is the information indicating the position of P3;

the data of 136 concerned with subprogram 2 is the information indicating C and c;

the data of 134 concerned with subprogram 3 is the information indicating the position of S3;

the data of 135 concerned with subprogram 3 is the information indicating the position of P4; and the data of 136 concerned with subprogram 3 is the information indicating D and d.

Figure 4:
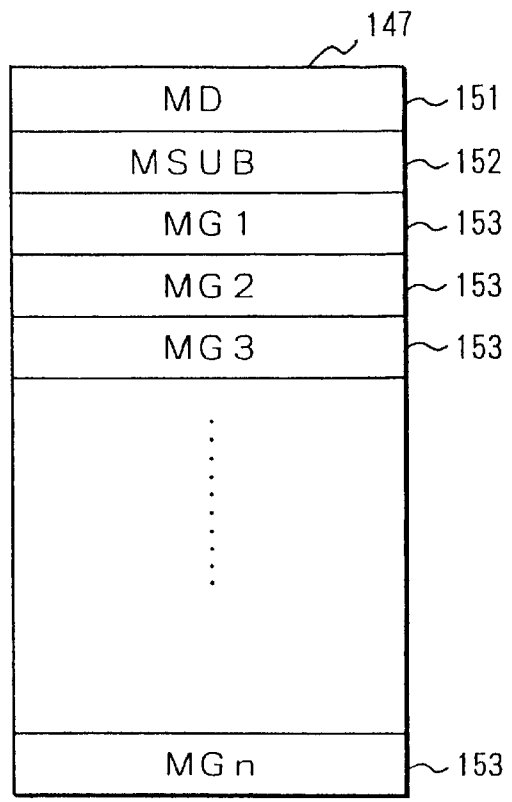
FIG. 4 illustrates a table which indicates M command statuses.

FIG. 3 illustrates a table indicating other information stored at the execution time. 141 denotes the coordinate value of each axis at that point, 142 represents a tool number used currently, 143 designates compensation command values such as a tool position offset value and a nose radius compensation value, 144 denotes the feedrate of a tool given by an F command, 145 indicates a spindle speed given by an S command, 146 represents the modal value of a G command, and 147 designates the state of an M command. As shown in FIG. 4, the state of the M command 147 indicates information consisting of an M command value 151 being executed, information 152 indicating the M command value currently executed, if the M command being executed is divided into a plurality of M command values as described later, and a final command value 153 in each group of M commands.

Each group of M commands indicates a group of M commands defining the machine status which has been classified according to their statuses. The machine status can be grasped by the M command specified for each group. For example, the following M commands indicating the spindle speed states:

M03: spindle forward rotation
M04: spindle reverse rotation
M05: spindle stop are defined as a single group, and checking which M command has been given last within this group allows the current machine status to be grasped.

The values of each group of M commands, which are updated by the execution of the machining program 103 and also updated by the manual operation (MDI), allow the current machine status to be grasped.

The grouping of the M commands can be set on the screen of the NC operation panel 11 as shown in FIG. 6. 160 shows a screen display example, 161 indicates the M command values, and 162 designates group numbers. In the example of FIG. 6, the following M commands are specified as a first group:

M03: spindle forward rotation
M04: spindle reverse rotation
M05: spindle stop and the following M commands are specified as a second group:

M07: mist coolant ON
M08: liquid coolant ON
M09: coolant OFF

166 indicates comments annotated for the M commands so that the contents of the M commands may be easily grasped by the operator.

Figure 7:
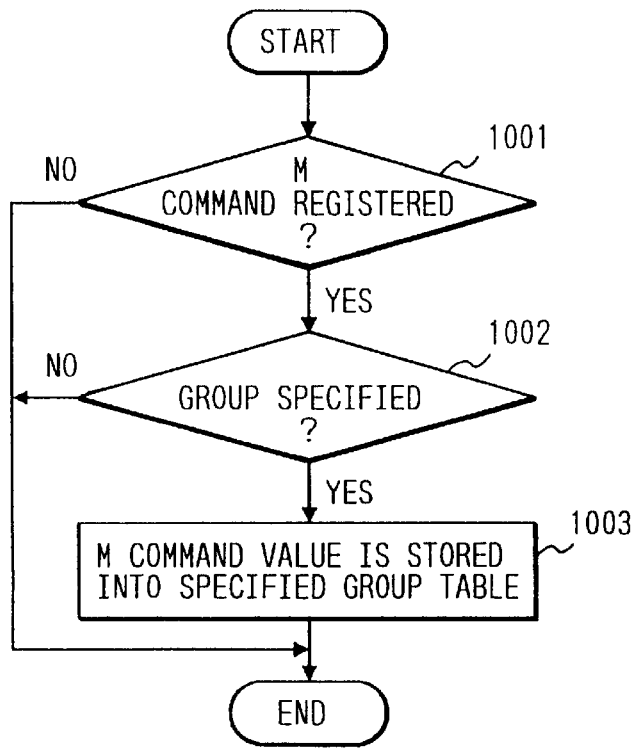
FIG. 7 is a flowchart illustrating a method of updating the values of each group of M commands.

FIG. 7 is a flowchart indicating how the values of each group of the M commands are updated. When an M command is given, it is judged whether or not that M command value given has already been registered (step 1001). To judge whether or not the M command value has already been registered is to check whether or not the M command value given has already been registered into the M command value 161 in the M command table shown in FIG. 6.

If the M command value given has already been registered, it is then judged whether or not the M command value given has already been specified as a group (step 1002). To judge whether or not the M command value given has already been specified as a group is to check whether or not a group number has already been specified in 162 of the M command table shown in FIG. 6.

If the M command value given has already been specified as a group, the M command value given is stored into the table of the specified group number (MG1 to MGn) (step 1003).

As described above, the data shown in FIGS. 2, 3 and 4 allows the status of the NC machine tool to be grasped. To store the NC machine tool status indicated at step 121 of FIG. 1 is to store the contents of the tables shown in FIGS. 2, 3 and 4 into a dedicated area (not shown).

Figure 8:
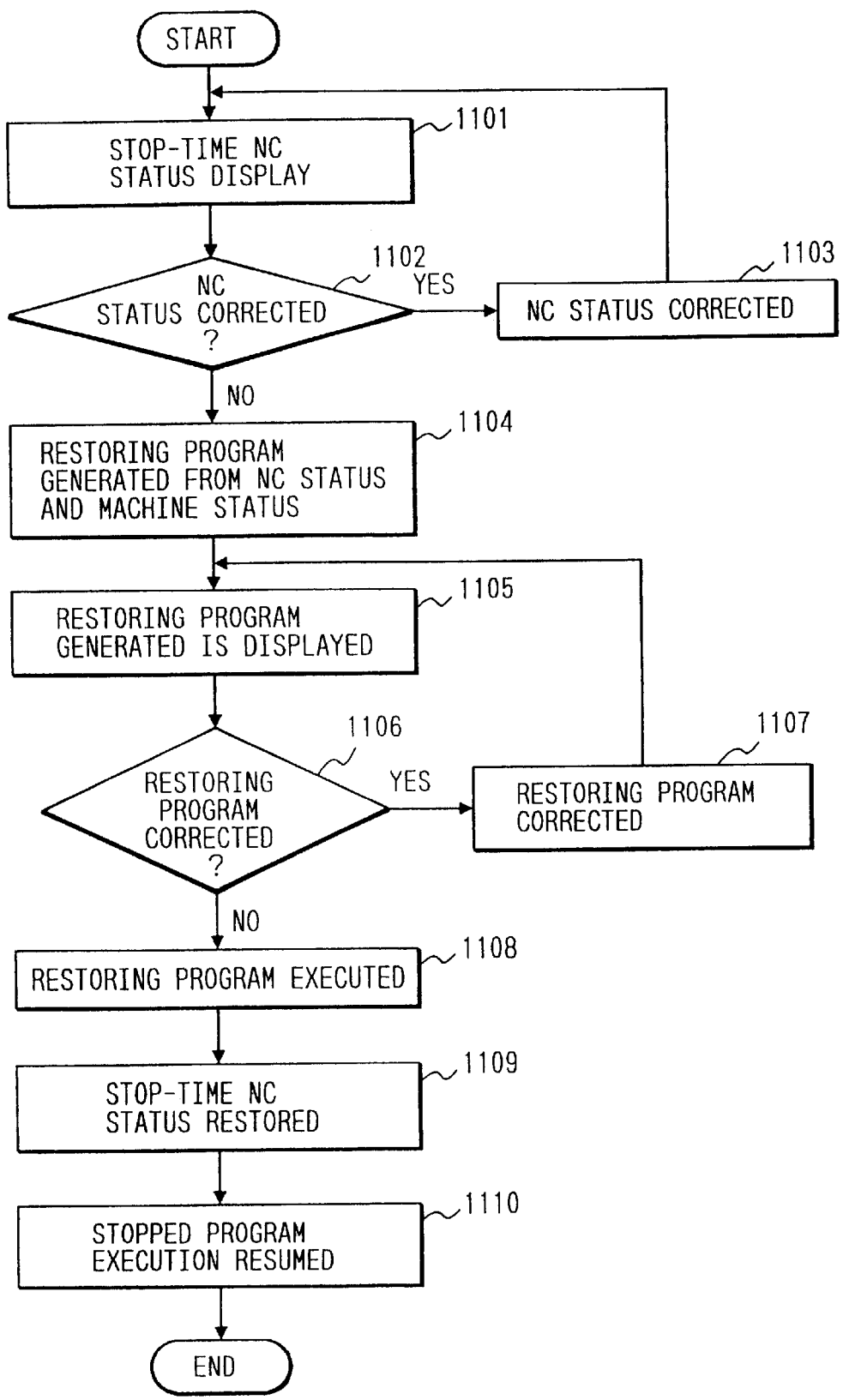
FIG. 8 is a flowchart illustrating a procedure of resuming machining after a stop.

FIG. 8 is a flowchart illustrating a procedure of resuming the NC machining program 103 when it has been stopped. When the NC machining program 103 is resumed, the stop-time NC machine tool status is displayed on the screen of the NC operation panel 11 (step 1101). The stop-time NC machine tool status means the contents of the NC machine tool status stored into a dedicated area (not shown) indicated at step 121 of FIG. 1.

FIG. 9A gives a display example of the screen on the NC operation panel 11. 170 indicates a display screen, 171 represents information indicating the stop position of the NC machining program 103 at the stop time, 172 designates position information of the main program, 173 denotes position information of subprogram 1, 174 indicates position information of subprogram 2, 175 designates program numbers, 176 represents sequence numbers, 177 indicates the block numbers, 178 denotes the number of repetition times and the number of execution times, 179 indicates program numbers at the beginning of the subprograms, 180 represents sequence numbers at the beginning of the subprograms, and 181 designates block numbers at the beginning of the subprograms.

The display example of FIG. 9A indicates that subprograms can be nested up to two levels. Although subprograms may only be nested up to the two levels in the display example of FIG. 9A, the screen may be modified according to the nesting permitted. 182 indicates the coordinate value of each axis. Though the coordinate values of X, Y, Z and C axes are displayed in the display example of FIG. 9A, the axes displayed may also be changed as necessary. 183 denotes a used tool (T), a compensation number (H), a feedrate (F) and a spindle speed (S). 184 represents the modal value of the G command.

185 denotes the M commands finally specified in the groups of M commands. Since the finally specified M commands are displayed in correspondence with the groups and along with M command values 186 and corresponding comments 187, the contents of the M commands can be judged easily and also the machine status grasped easily. The contents displayed in 187 are comment information specified in 166 of FIG. 6.

Each information 171 at the interruption shown in FIG. 9A will be explained with reference to FIGS. 9B and 9C.

Figure 9B:
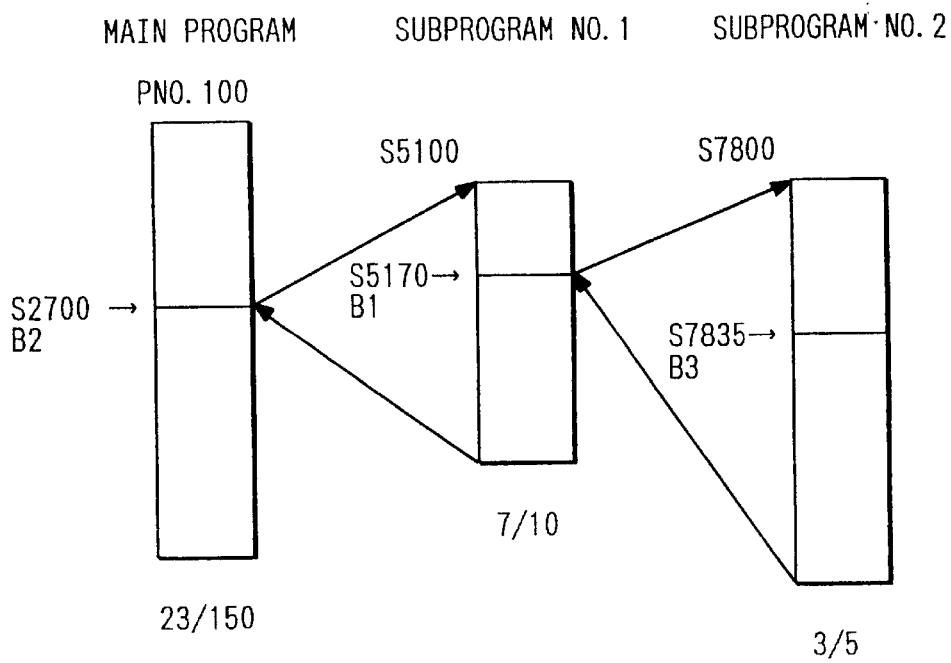
FIG. 9B shows a related machining program and FIG. 9C provides related information.
Figure 9C:
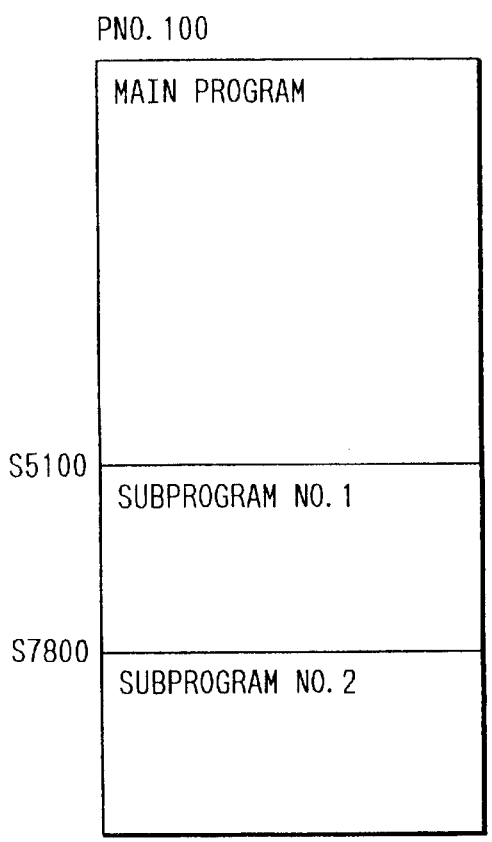
FIG. 9A gives a display example on the screen of an NC operation panel.

Specifically, in an example of a NC machining program shown in FIG. 9B, a subprogram 1 (SUB 1) is stored from a sequence number 5100 and a subprogram 2 (SUB 2) is stored from a sequence number 7800 into the program having a program number (PNO) 100. FIG. 9C shows a state where the NC machining program PNO 100 shown in FIG. 9B is interrupted. Numerical values in each information 171 at the interruption shown in FIG. 9A represent in FIG. 9C that the subprogram 1 is called ten times and the seventh call is now being executed at the position of a block number 2 of a sequence number 2700 in the main program. Also, a subprogram 2 is called five times and the third call is now being executed at the position of a block number 1 of a sequence number 5100 in the subprogram 1, and a block number 3 in a sequence number 783 in the subprogram 2 is now being executed.

Returning to FIG. 8, the operator judges whether the NC status displayed at step 1101 requires correction or not (step 1102), and if correction is required, the NC status is corrected (step 1103). The NC status can be corrected by moving a cursor indicated by 188 in FIG. 9A to the area to be corrected and entering data from a keyboard (not shown) on the NC operation panel 11. The cursor is moved using cursor keys (not shown) on the keyboard. Corrections may be made to the data indicating the program positions 175 to 177 and 179 to 181, the number of repetition times and the number of its execution times 178, the coordinate value of each axis indicating the stop position 182, the values indicating the used tool (T), compensation number (H), feedrate (F) and spindle speed (S) 183, the modal values of the G command 184, and the M command values corresponding to the groups 186.

At a point when it is not necessary to correct the NC status, the system compares the status of the NC machine tool displayed at step 1101 with the current NC machine tool status and generates a restoring program (step 1104).

Figure 10:
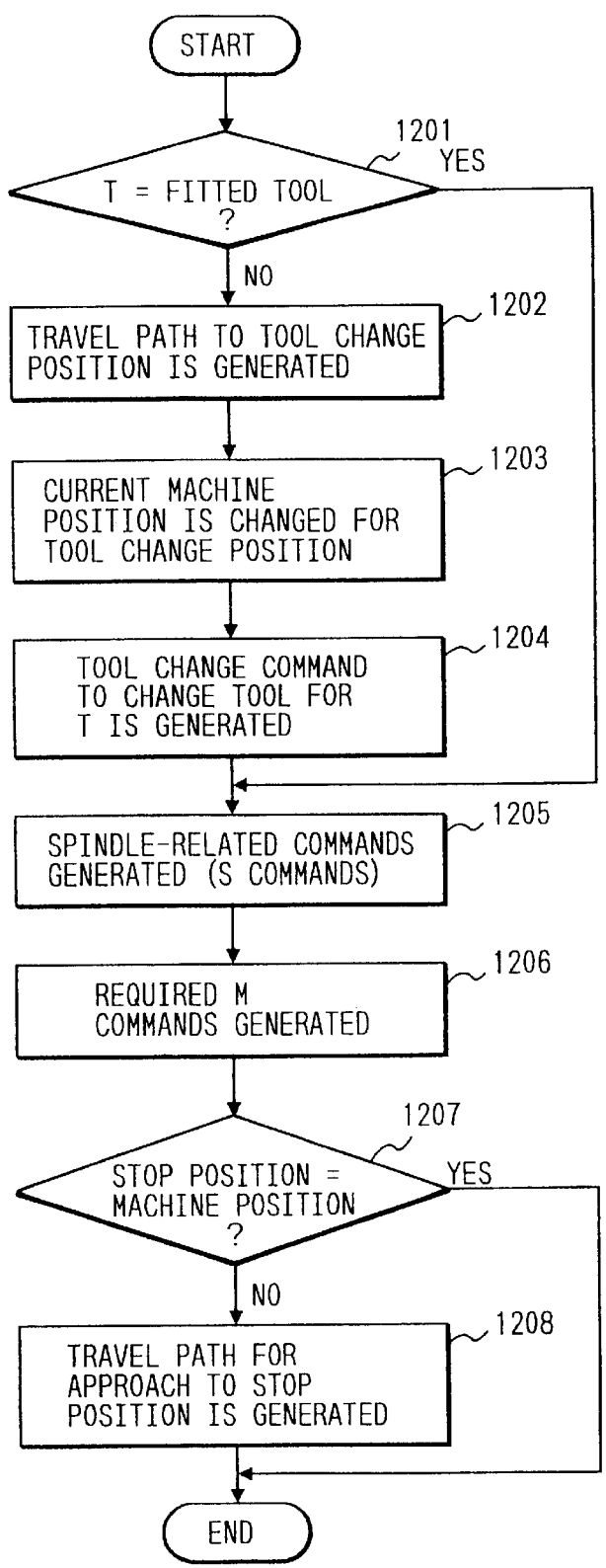
FIG. 10 is a flowchart illustrating restoring program generation.

FIG. 10 is a flowchart illustrating restoring program generation. First, the tool number used at the stop time is compared with a tool number currently fitted (step 1201). If they are equal, a tool change is not required and therefore the processing jumps to step 1205. If they are different, a tool change is made at steps 1202 to 1204 so that the currently fitted tool is exchanged for the tool used at the stop time.

At step 1202, a path on which the currently fitted tool is moved up to a tool change position is generated, and at step 1203, the current machine position is changed for the tool change position because if the command generated at step 1202 is executed, the fitted tool will move to the tool change position. At step 1204, a command for tool change is generated.

At step 1205, spindle-related commands are generated, i.e., a spindle speed command (S) and spindle rotation direction commands (M03, M04) are generated. At step 1206, M commands required to return the NC machine tool status to the stop-time status are output. This output is provided to set the values of MG1 to MGn indicated in FIG. 4 to the same values as at the stop time, and if the values at the stop time are different from those at the resumption time, the M command values which will set the resumption-time values to the stop-time values are generated.

Figures 11, 12:
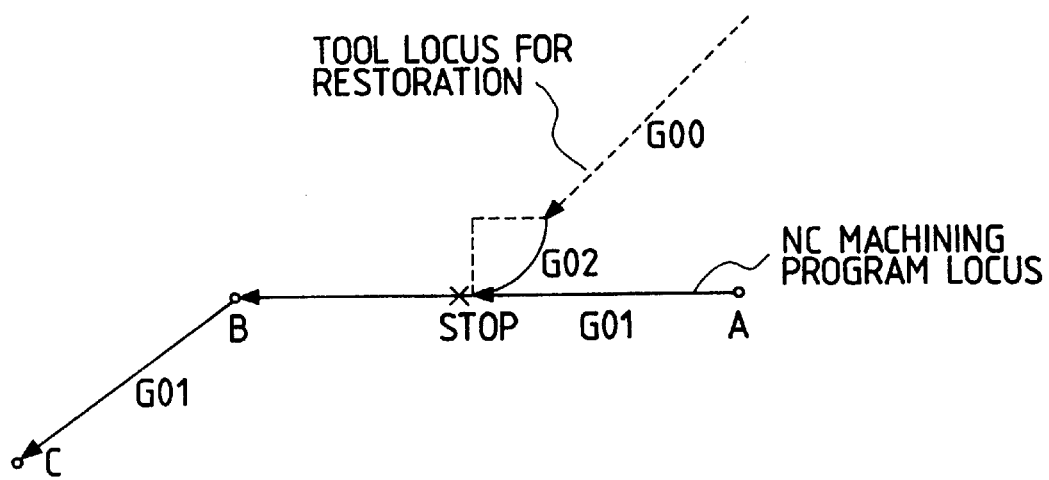
FIG. 11 provides an example of a tool locus on which a tool is returned to a stop position.
FIG. 12 gives an example of the restoring program displayed on the screen.

Then, the stop-time position and the current position are compared (step 1207). If they differ, a travel path required to return to the stop position is generated (step 1208). To return to the stop-time position, a direct approach to the stop position may be replaced by an approach along the locus of an arc making contact with the stop position (indicated by G02) as shown in FIG. 11. It is recommended to specify the radius and the like of the arc in parameters. This way of approach allows the tool to return without damaging the workpiece.

As described above, the restoring program generated at step 1104 in FIG. 8 is displayed on the screen of the NC operation panel 11 (step 1105). FIG. 12 is an example of the restoring program displayed as described above.

The operator judges whether the restoring program generated as described above must be corrected or not (step 1106). If the restoring program must be corrected, correction is made (step 1107). To correct the restoring program, move the cursor 188 to a correction portion as shown in FIG. 12 and correct the program in a similar method used to correct the ordinary NC machining program 103.

The restoring program generated in such a manner is executed at the resumption of machining (step 1108), the NC status is then restored to the status displayed at step 1101 (step 1109), and the execution of the NC machining program 103 stopped is resumed (step 1110).

In the above procedure, resumption processing is performed for the machining program that was stopped. While the example of machining resumption processing carried out after the machining program being executed has been stopped and the operator has performed interrupt processing was described in this embodiment, execution processing may also be started halfway through the machining program in the following procedure. Make a modal search up to a position where the program desired to be started partway is desired to be started partway. This virtually makes up the status of the NC machine tool at a time when the machining program has been executed up to the stop position. Hereafter, processing is carried out in the procedure shown in FIG. 8 as when the machining program was stopped. If there is any inconvenience in the result of the modal search, the status is corrected optionally in accordance with step 1103 in FIG. 8.

When the modal search is made in the present embodiment, the area where the current machine status is stored is not updated but the area where the stop-time machine status is stored is updated, and machining is executed in the procedure as employed at the time of machining stop described above to execute the machining program after the modal search.

Also, since the area where the stop-time machine status is stored always exists and is not generated at only the machining program stop time, data may be set directly to this area where the stop-time machine status is stored to start the machining program halfway, without the machining program being stopped or the modal search being made. Namely, if the status of the NC machine tool at a point when halfway start is to be done is already known in a machining program desired to be started halfway, midway or partway start processing may be carried out starting at step 1101 shown in FIG. 8, without the modal search being made as described above. That is, the status of the NC machine tool for midway start may be entered directly at step 1103.

Figure 33A:
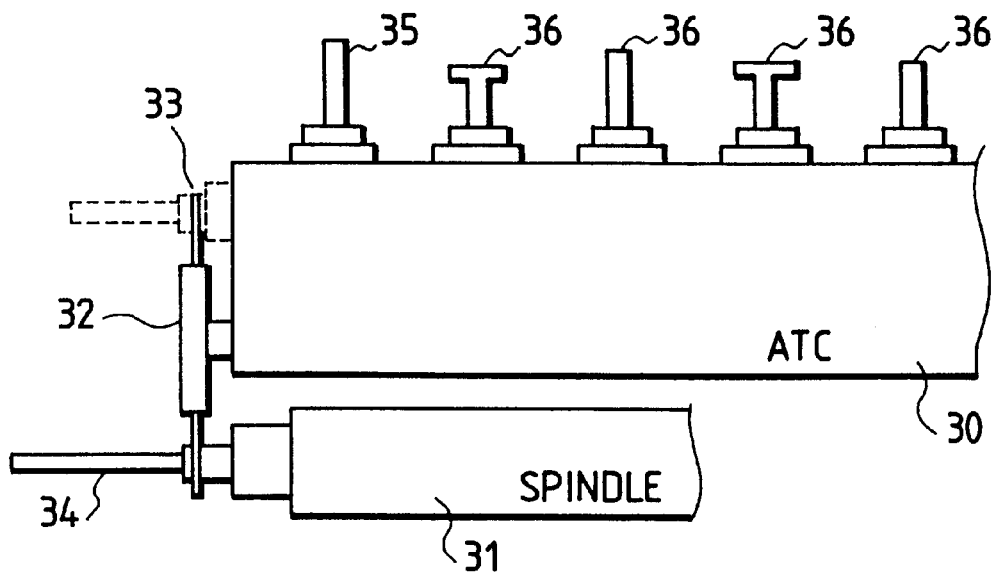
FIGS. 33A and 33B illustrate an example of an automatic tool changer (ATC).
Figure 33B:
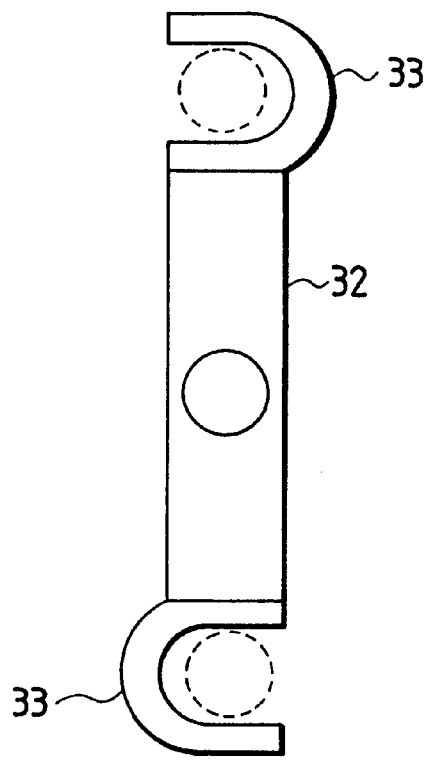
Figure 34:
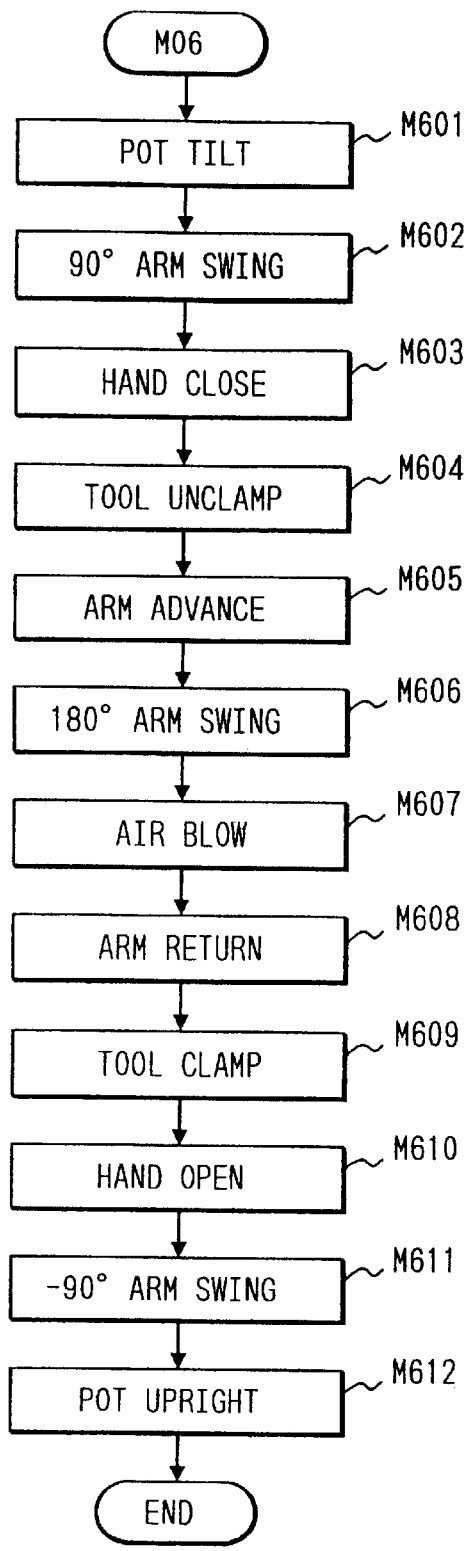
FIG. 34 is a flowchart illustrating a series of tool changing operations.

Also, as a case where the NC machine tool is stopped, there is a case wherein some fault occurring during a series of machine operations may disable the series of machine operations from being terminated, stopping machining. For instance, it is a case where a fault has occurred during a tool change operation using the ATC as shown in FIG. 33. It is possible to easily recognize a stopped operation since the present embodiment has the M command value 151 being executed by the PC 2, or if the M command value being executed is divided into a plurality of M command values as described later, the information 152 which indicates the area being executed among such M command values, as shown in FIG. 4. The values 151, 152 may be counted by the PC 2 at the time of data transfer between the NC 1 and the PC 2, or when the PC used is of a built-in type, the data 151, 152 may be provided in a common table accessible by both, which is often contained in such type of PC.

Also, while each value 153 in FIG. 4 is generally updated only by the M command, it is difficult to grasp the status of the NC machine tool correctly if the NC 1 monitors only the M commands when a function to operate the NC machine tool from the machine operation panel 12 of the NC machine tool, without the aid of the NC 1. In such a case, these values may be taught from the PC 2 like the data 151, 152.

Since the information on this MSUB 152 is displayed in the form of both the M command value and the corresponding comment on the screen as the stop information as indicated by 189 in FIG. 9A, the operator can easily check the stopped operation.

Figures 13, 14:
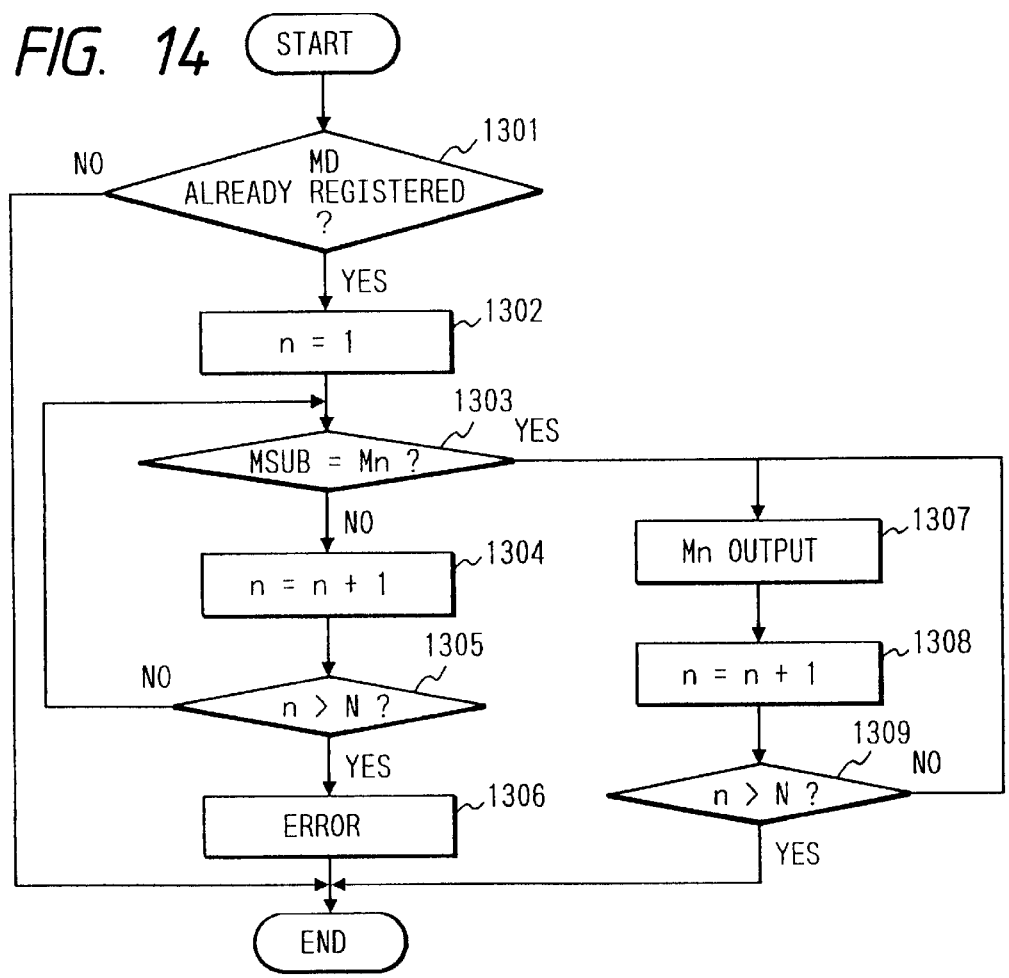
FIG. 13 is a table in which M commands corresponding to a series of machine operations have been defined.
FIG. 14 is a resumption processing flowchart for a series of machine operations.

FIG. 13 shows a table where M commands corresponding to a series of machine operations are defined. Data equivalent to this table is preset in correspondence with each series of machine operations.

FIG. 14 is a flowchart showing the resumption processing performed at a time when a series of machine operations have been stopped midway or partway as described above. First, it is checked whether or not the M command value stopped has already been registered (step 1301). The M command value stopped has already been registered if the M command and comment corresponding to each step of the series of machine operations has already been registered as shown in FIG. 13. If it has already been registered, the value of n is initialized to 1 at step 1302. The value of n indicates the sequence of the series of machine operations. It is checked whether or not the value of MSUB indicated by 152 in FIG. 4 matches the value of Mn (step 1303). The value of Mn is the value of the M command corresponding to the series of machine operations defined in FIG. 13 at the specified step. If it does not match, the value of n is incremented by 1 for comparison with next data (step 1304). At this time, it is checked whether the value of n. has exceeded the number of steps N defined in FIG. 13 (step 1306). If it is within N, the processing is repeated, beginning at step 1303. In the example of FIG. 13, the value of N is 12.

As a matter of course, the value of MSUB must exist in Mn defined in FIG. 13. However, since the value of Mn may be defined incorrectly in FIG. 13, an error check is made to find such an error. If the value of MSUB does not exist in Mn defined in FIG. 13, it is judged as an error (step 1306).

When the value of corresponding Mn is found, the value of this Mn is output (step 1307). In order to output the remaining M command values not yet executed, steps 1307 to 1309 are repeated to provide data output up to the number of steps N.

Here, the output of the Mn data may be included in the restoring program and executed as part of said restoring program, or when the operator presses predetermined control buttons (not shown) on the NC operation panel 11 or on the machine operation panel 12, said output series of Mn command values may be executed to perform the remaining operations of the series of machine operations.

A numerically controlled machine tool concerned with a second embodiment of the invention will now be described. FIG. 6 shows a setting screen on which the M commands, which need not be completed in the first embodiment, are specified. In FIG. 6, 163 indicates a table where M commands which need not be completed are specified. "*" in this area indicates that this M command need not be completed before a next command is executed. To specify "*" in FIG. 6, move the cursor to the "COMPLETION UNREQUIRED" area 163 of the corresponding M command and press the numeral key "1" if the M command need not be completed. When "1" is pressed, the "*" mark is displayed on the screen, indicating that the corresponding M command has been specified as the M command which need not be completed. If the M command must be completed, press "0". When "0" has been pressed, the corresponding area remains blank on the screen.

Figure 15:
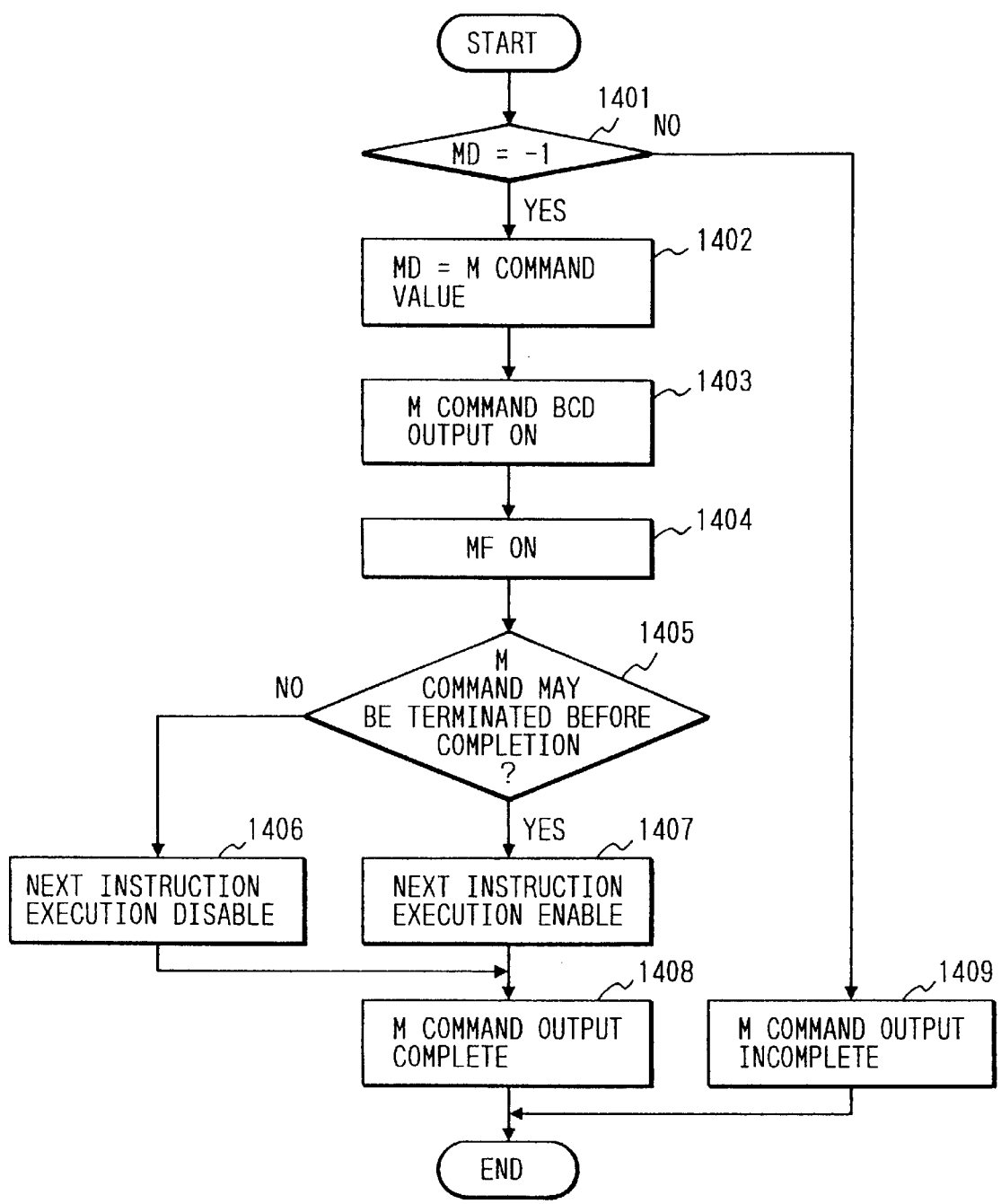
FIG. 15 is a flowchart illustrating M command output processing.

FIG. 15 is a flowchart illustrating M command output processing which is required during a program which is executed every constant period. When an M command is given, the PC 2 judges whether or not another M command is being executed (step 1401). This judgement can be made by checking the value of "MD" 151 shown in FIG. 4. The M command being executed by the PC 2 is stored in "MD" 151 and the value of "−1" stored indicates that there is no M command being executed. Hence, whether or not the M command is being executed by the PC 2 can be determined by judging whether or not the value of "MD" 151 is "−1".

If the M command is being executed in the PC 2, it is not possible to cause the PC 2 to execute a next M command. Hence, the output of the next M command is terminated as incomplete (step 1409). In this case, the M command output processing shown in FIG. 15 will be performed again later, the M command is unprocessed, and therefore, the processing does not shift to the execution of the next command.

If no M command is being executed in the PC 2, the M command value specified in "MD" 151 is stored (step 1402). Then, the M command value is output to the PC 2 (step 1403). The MF signal is switched on (step 1404). It is checked whether or not the M command need not be completed (step 1405). This check is to judge whether or not the M command has been specified with "*" in the "COMPLETION UNREQUIRED" area 163.

If the current M command must be completed, the next instruction is disabled for execution (step 1406). When this "next command execution disable" has been set, the next command is executed after the completion of the current M command. If the current M command need not be completed, the next instruction is enabled for execution (step 1407). When this "next command execution enable" has been set, the next command is executed without waiting for the completion of the current M command. Since the output of the M command to the PC 2 is complete, the processing is terminated (step 1408). If not completed, the process is made again in the succeeding period and repeatedly executed until the output of the M command is completed.

Figure 16:
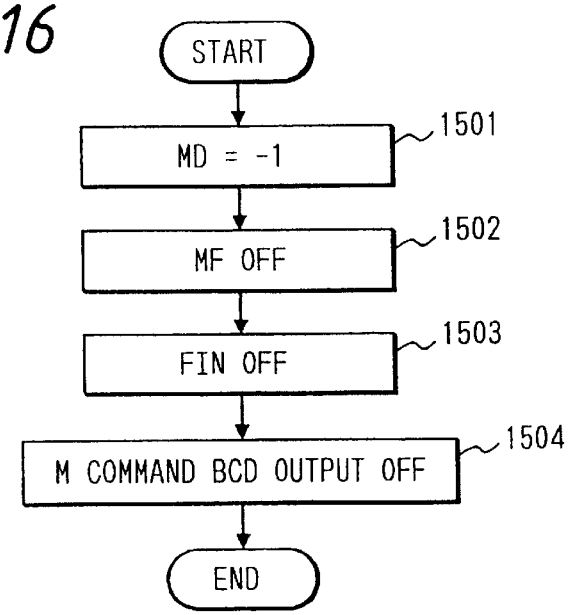
FIG. 16 is a flowchart illustrating M command completion processing.

FIG. 16 is a flowchart illustrating M command completion processing. When the M command given is complete in the PC 2, a completion signal (FIN) is transmitted to the NC 1. In response to this signal, the NC 1 performs processing shown in FIG. 16.

First, since there is no M command which is being executed in the PC 2, the value of "MD" 151 is set to "−1" (step 1501). Then, the MF signal is switched off (step 1502), the FIN signal is switched off (step 1503), lastly the M command BCD output is switched off (step 1504), and the processing is terminated.

Figure 18:
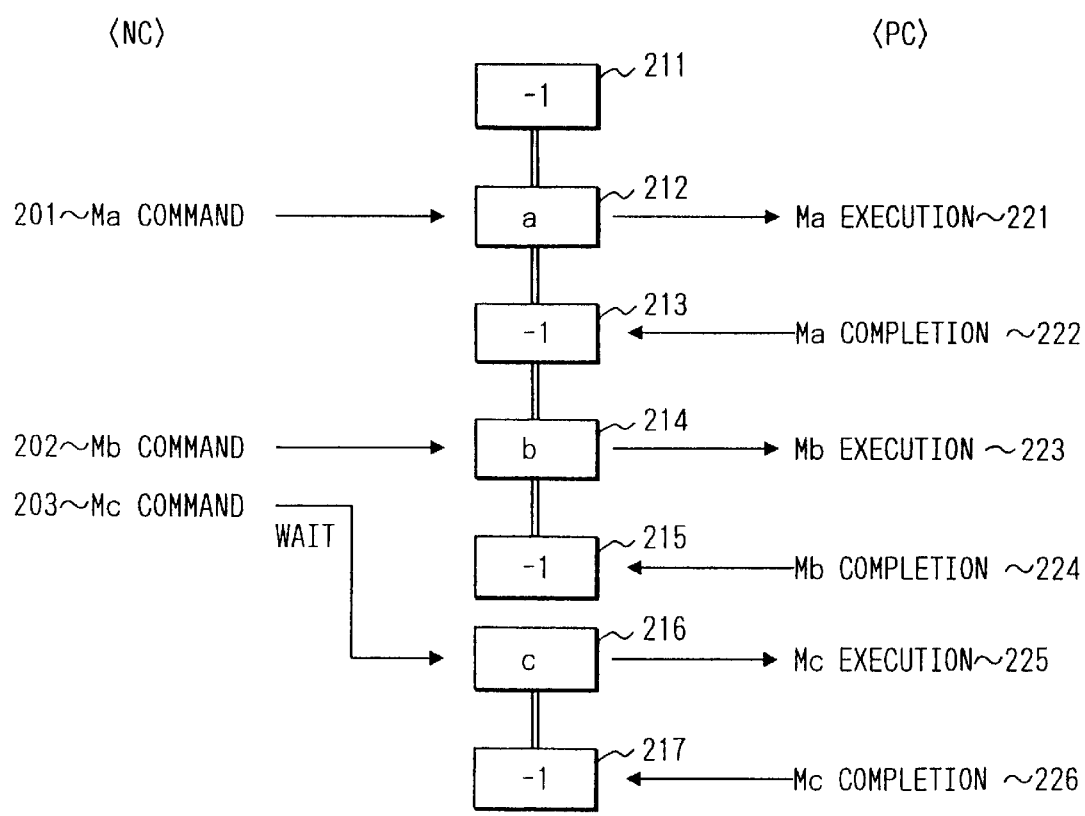
FIG. 18 illustrates the processing of an NC and a PC.

FIG. 18 illustrates the processing of the NC 1 and the PC 2. 201 to 203 indicate M command values which are just beginning to be output from the NC 1 to the PC 2, 211 to 213 designate the values of "MD" 151, and 221 to 226 represent the internal statuses of the PC 2. Now, when Ma is given (201), data is output intact to the PC 2 because the value of "MD" 151 is "−1" (211), and the value of "MD" 151 is then changed to "a". Here a is supposed to be the command value of M.

In response to this output, the PC 2 executes Ma (221). On termination of the Ma execution (222), the value of "MD" 151 is set to "−1" (213). When the next M command Mb is given (202), data is output intact to the PC 2 since the value of "MD" 151 is "−1" (213), and the value of "MD" 151 is changed to "b". Here b is the command value of M.

In response to this output, the PC 2 executes Mb (223). When the next M command Mc is given (203), data is not output to the PC 2 since the value of "MD" 151 remains "b" which indicates that the PC 2 is still executing Mb, and the NC 1 waits until the value of "MD" 151 is set to "−1".

On termination of the Mb execution (224), the PC 2 sets the value of "MD" 151 to "−1" (224). In response to this setting, the NC 1 outputs the M command Mc to the PC 2 and changes the value of "MD" 151 to "c". Here c is the command value of M. In response to this output, the PC 2 executes Mc (225). On termination of the Mc execution (226), the PC 2 sets the value of "MD" 151 to "−1" (226). In the example of FIG. 18, it is assumed that Ma, Mb and Mc are all M commands that need not be completed.

Whereas an interface between the conventional NC 1 and the PC 2 was shown intact in this embodiment, the built-in PC more often used recently is designed to allow the NC 1 and the PC 2 to have common memories for data exchanges between each other, and therefore, the interface between the conventional NC 1 and the PC 2 need not be provided.

For example, the MF or FIN signal is required when the NC 1 and the PC 2 can only make data transfers on a bit basis. If the NC 1 and the PC 2 have common memories and can exchange data with each other freely in a system having the built-in PC, M commands can be processed with only "MD" 151. That is, when an M command value is transmitted form the NC 1 to the PC 2, it is only required to set the M command value to "MD" 151, and when completion is sent from the PC 2 to the NC 1, it is only necessary to set "MD" 151 to "−1".

The NC 1 can confirm the completion of the M command when "MD" 151 is set to "−1" and the PC 2 can confirm the transmission of the M command from the NC 1 when "MD" 151 changes to a numerical value other than "−1".

Figure 17:
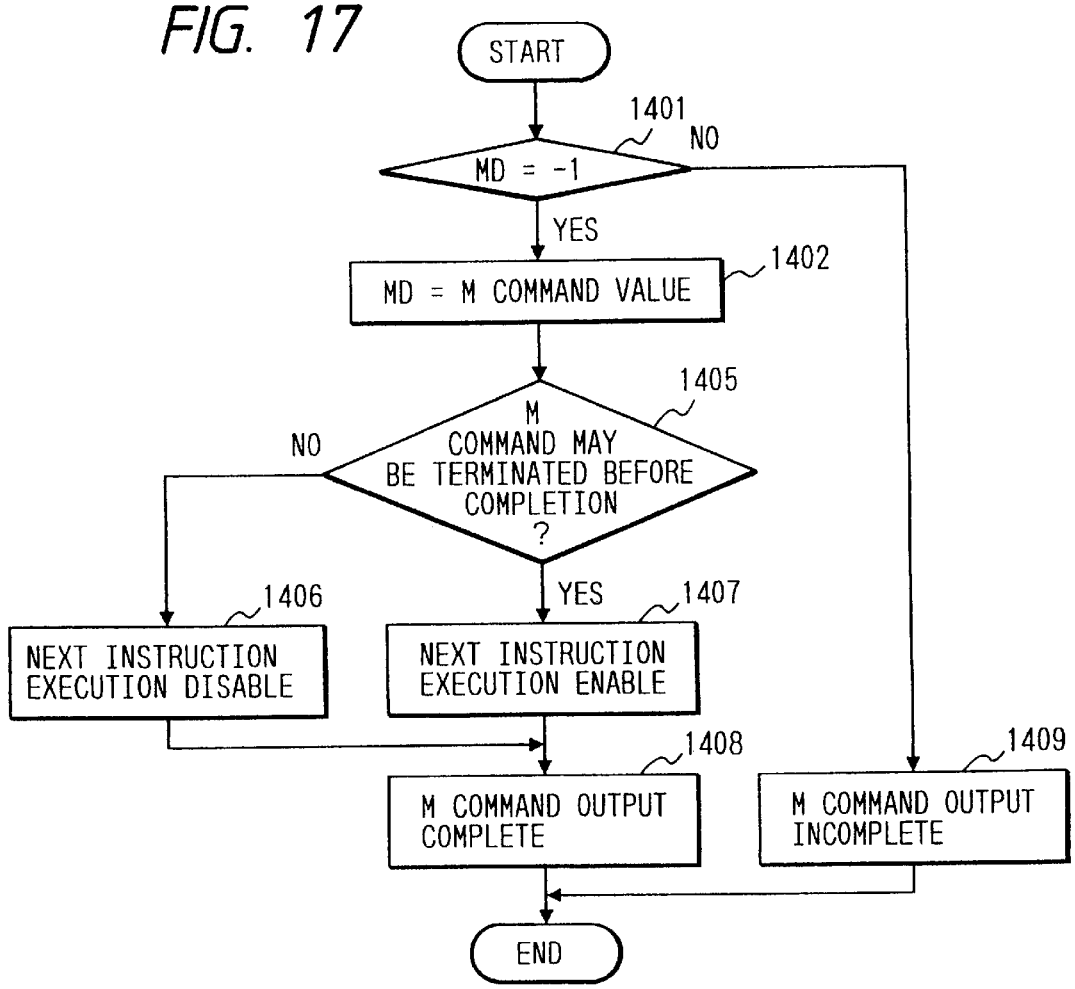
FIG. 17 is a flowchart illustrating M command output processing.

In such a system including the built-in PC, steps 1403 and 1404 in the processing of FIG. 15 can be omitted as shown in FIG. 17.

While the example of setting the M command which need not be completed from the screen was given in said embodiment, whether M commands must be or need not be completed may be differentiated in the machining program.

For instance, the values of the M commands that must be completed may be defined by "M" as indicated below:

M123;

and the values of the M commands which need not be completed may be defined by "m" as indicated below:

m123;

In this manner, the judgement at step 1405 in FIG. 17 may be made by judging whether the M command specified has been specified by "M" or "m".

Also, the method of classifying M is not limited to the above, and the values of the M commands which must be completed may be defined as conventionally by "+" as indicated below:

M+123;

and the values of the M commands which need not be completed may be defined by "−" as indicated below:

M−123;

Alternatively, as a method of classifying the two in a machining program, the values of the M commands that need not be completed may be annotated with a lower-case character as indicated below:

"M123;", "Mw123;"

or the values of the M commands which need not be completed may be annotated with a special character as indicated below:

"M123;", "M$123;"

A numerically controlled machine tool concerned with a third embodiment will now be described. FIG. 6 shows a setting screen on which M commands of which output is locked in the test mode of the third embodiment are specified. In FIG. 6, 164 indicates a table in which M commands of which output is locked in the test mode are specified. For any of the M commands annotated with "*" in this area, its output is not provided if this M command is given in the test mode.

To specify "*" in FIG. 6, move the cursor to the "TEST LOCK" area 164 of the corresponding M command and press the numeral key "1" if the M command is the one whose output is to be locked in the test mode. When "1" is pressed, the "*" mark is displayed on the screen, indicating that the corresponding M command has been specified as the M command which output is to be locked in the test mode.

If the M command is an ordinary one whose output is not to be locked in the test mode, press "0". When "0" has been pressed, the corresponding area remains blank on the screen.

Figure 19:
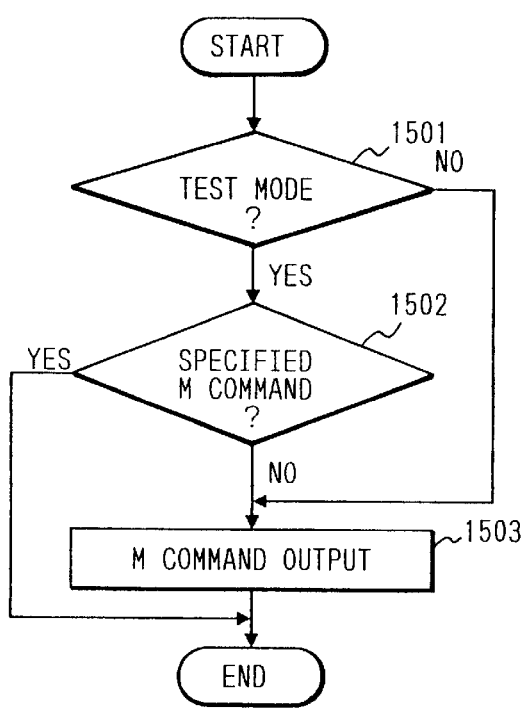
FIG. 19 is a flowchart illustrating M command output processing.

FIG. 19 is a flowchart illustrating M command output processing. When an M command is given, it is judged whether or not the machine is in the test mode (step 1501). This test mode is specified by a select switch (not shown) on the NC operation panel 11.

If the machine is not in the test mode, M command output processing is performed as ordinarily (step 1503). If the machine is in the test mode, it is checked whether or not the M command specified is the one of which output is to be locked in the test mode (step 1502). This check is to judge whether or not the M command is the one specified with "*" in the "TEST LOCK" area 164 in FIG. 6.

If the M command is the one whose output is to be locked in the test mode, the processing is terminated without the output of the M command being provided. This means that the specified M command has been ignored completely.

A numerically controlled machine tool concerned with a further feature of the invention will now be described.

FIG. 6 shows a setting screen on which M commands, whose output is provided even at the miscellaneous command lock time are specified. In FIG. 6, 165 indicates a table in which M commands of which output is provided even at the miscellaneous command lock time are specified. For any of the M commands annotated with "*" in this area, its output is provided even at the miscellaneous command lock time.

To specify "*" in FIG. 6, move the cursor to the "FORCED OUTPUT"area 165 of the corresponding M command and press the numeral key "1" if the M command is the one whose output is provided at the miscellaneous command lock time. When "1" is pressed, the "*" mark is displayed on the screen, indicating that the corresponding M command has been specified as the M command of which output is provided even at the miscellaneous command lock time. If the M command is an ordinary one whose output is not provided at the miscellaneous command lock time, press "0". When "0" has been pressed, the corresponding area remains blank on the screen.

Figure 20:
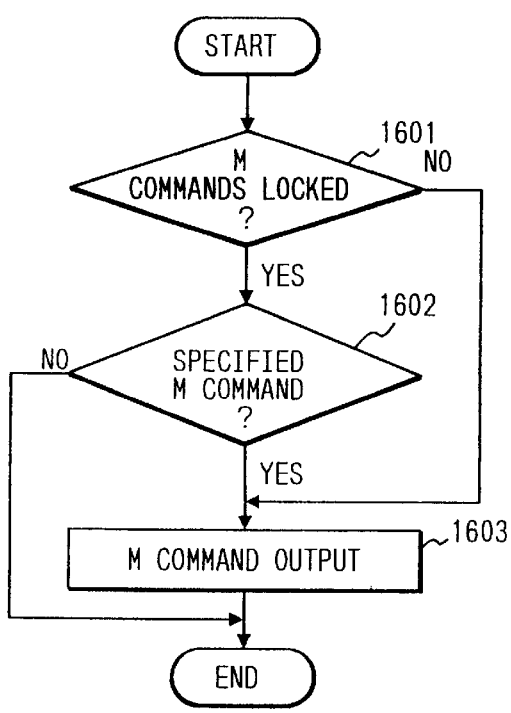
FIG. 20 is a flowchart illustrating M command output processing.

FIG. 20 is a flowchart illustrating M command output processing. When an M command is given, it is judged whether or not the machine is during the miscellaneous command lock time (step 1601). This miscellaneous command lock is specified by a select switch (not shown) on the NC operation panel 11.

If the machine is not during the miscellaneous command lock time, M command output processing is performed as ordinarily. (step 1603). If the machine is during the miscellaneous command lock time, it is checked whether or not the M command specified is the one of which output is provided even at the miscellaneous command lock time (step 1602). This check is to judge whether or not the M command is the one specified with "*" in the "FORCED OUTPUT" area 165 in FIG. 6.

If the M command is not the one whose output is provided at the miscellaneous command lock time, the processing is terminated without the output of the M command being provided. This means that the specified M command has been ignored completely. If the M command is the one of which output is provided at the miscellaneous command lock time, the M command is output even during the miscellaneous command lock time (step 1603).

Figure 21:
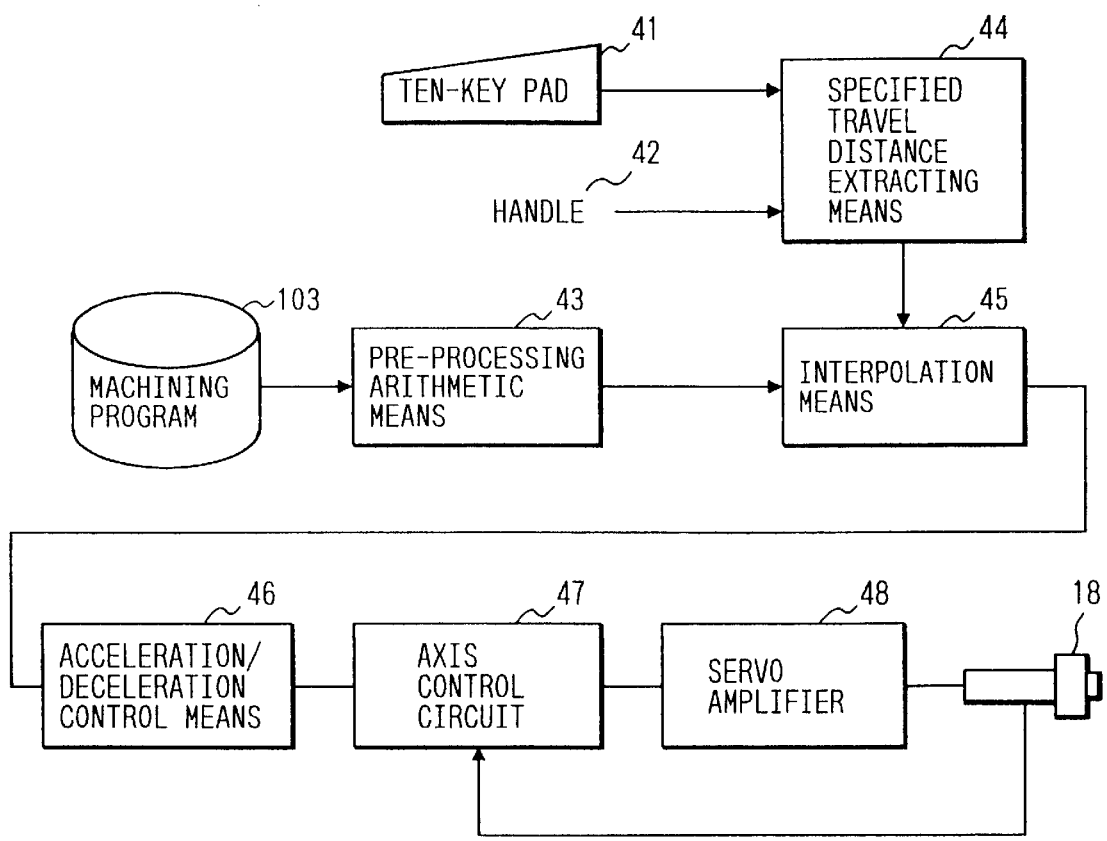
FIG. 21 is a main area block diagram for specifying travel distances.

A numerically controlled machine tool concerned with another feature will now be described. FIG. 21 is a block diagram of the main sections of this next embodiment. These blocks are processed under the control of software in the numerical control apparatus. Pre-processing arithmetic means 43 existing in the NC 1 shown in FIG. 26 reads the machining program and transmits a move command to interpolation means 45. The machining program 103 may either be a general EIA machining program or an automatic program which is often used in recent years.

Figure 26:
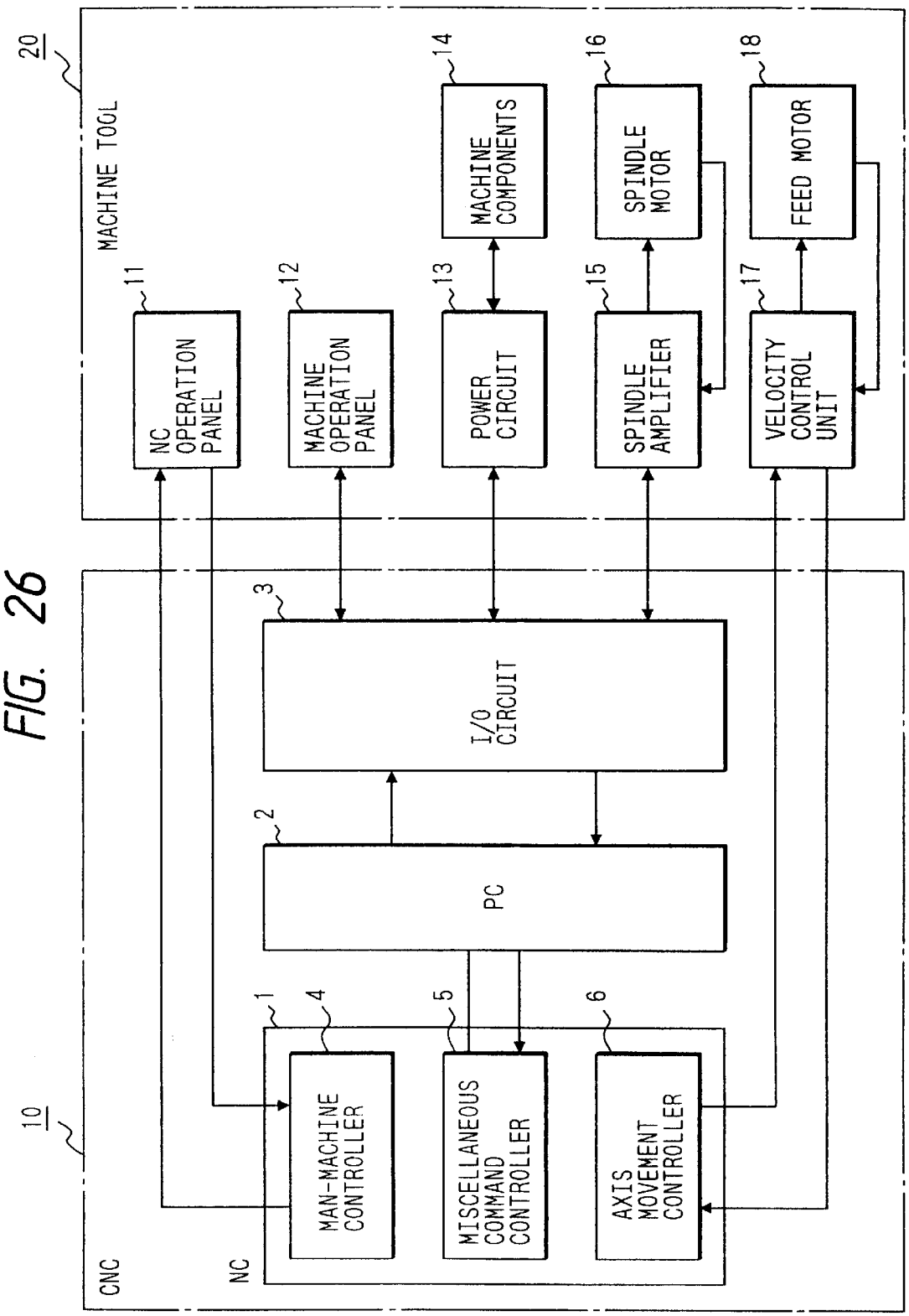
FIG. 26 is a schematic diagram of a CNC machine tool using a CNC with a built-in PC.
Figure 29:
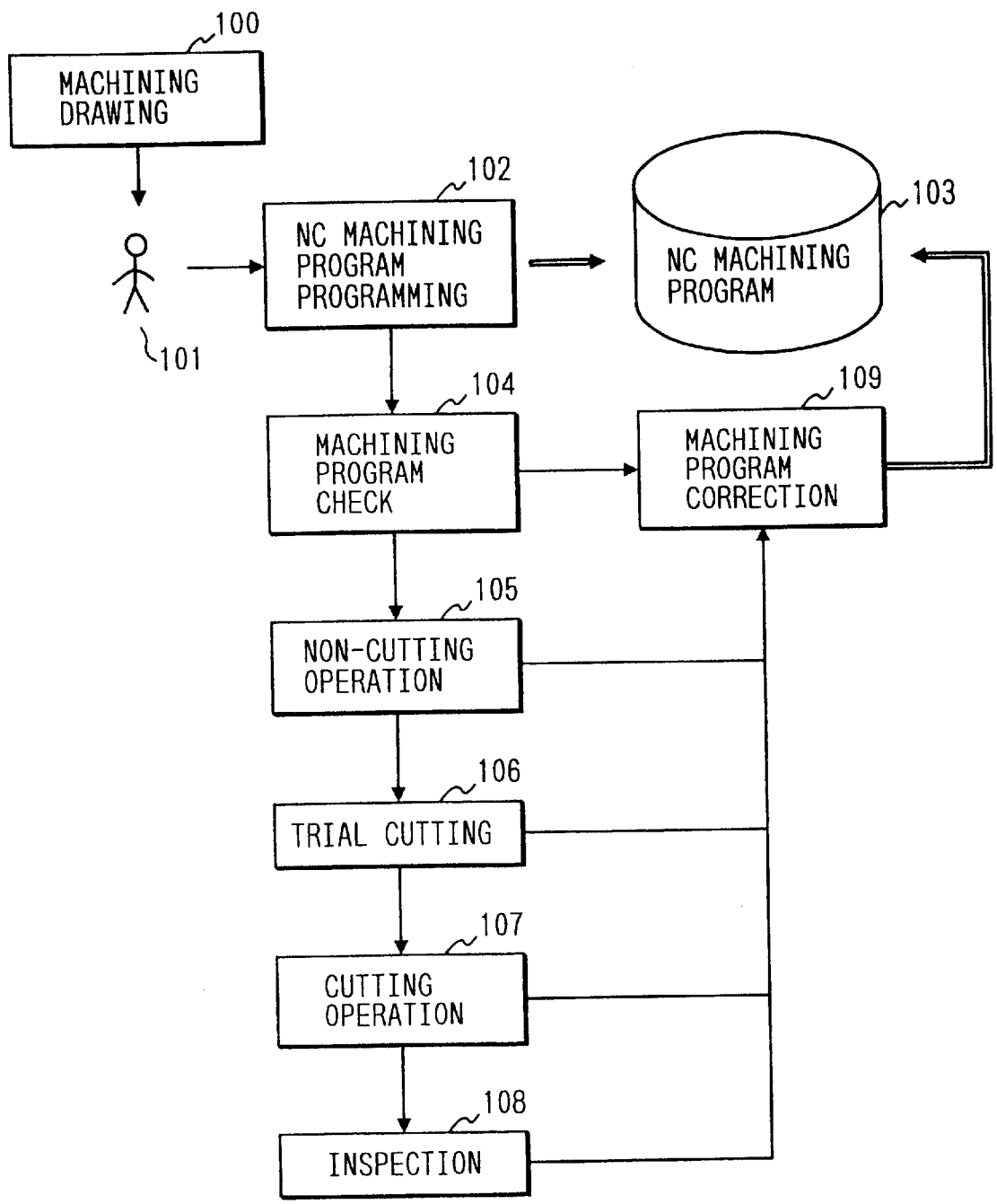
FIG. 29 illustrates a sequence of operations from machining program creation to workpiece inspection.
Figure 30:
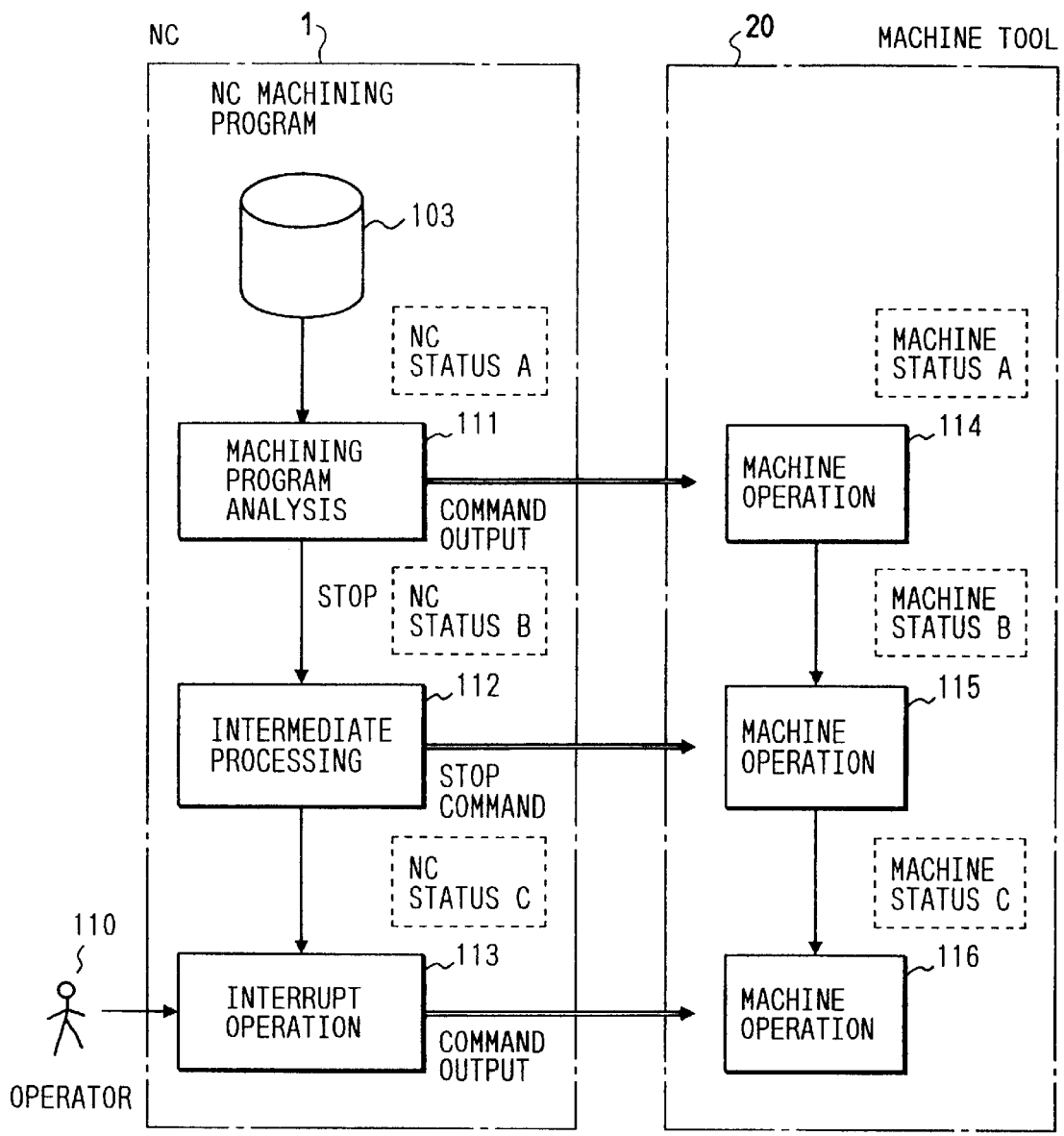
FIG. 30 illustrates the internal statuses of the NC and the numerically controlled machine tool.
Figure 31:
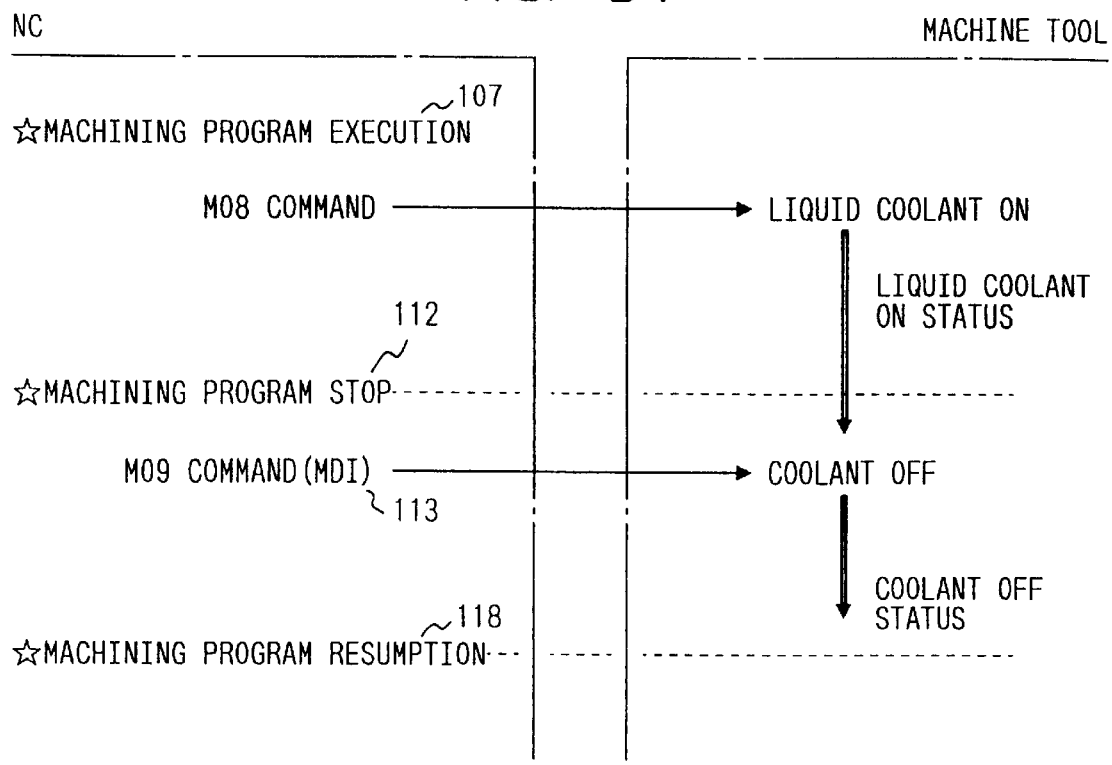
FIG. 31 illustrates an example of the internal statuses of the NC and the numerically controlled machine tool.
Figure 32:
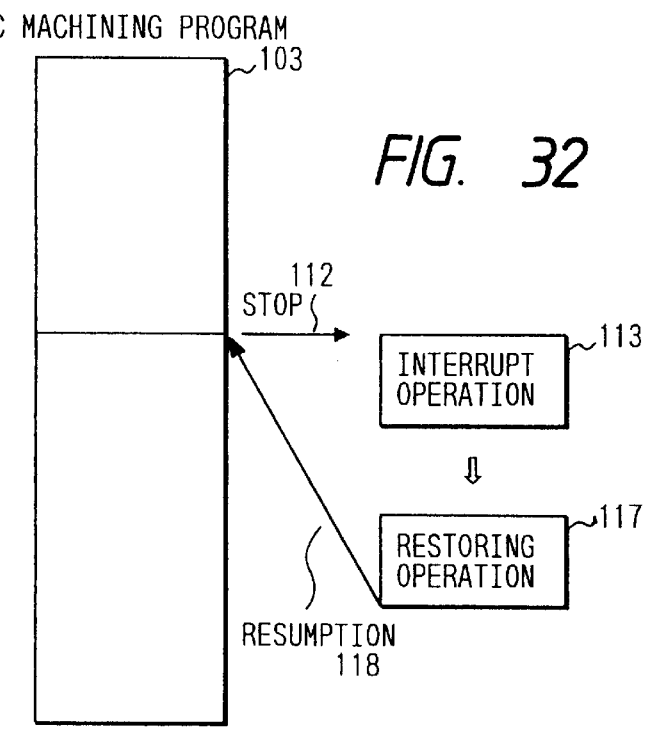
FIG. 32 illustrates how the NC machining program stopped is resumed.

Specified travel distance extracting means 44 existing in the man-machine controller 4 of the NC 1 shown in FIG. 26 calculates the specified travel distance of a tool on the basis of either numerical value data input from a ten-key pad 41 on the NC operation panel 11 or pulse data input from a handle 42 on the machine operation panel 12 in the test mode.

The test mode is specified by the switch (not shown) on the NC operation panel 11 and the specified travel distance extracting means 44 is supposed to output an infinite travel distance to the interpolation means 45 if not in the test mode. For example, when data is input from the ten-key pad 41, it is regarded that the input numerical value has specified the travel distance specified in a predetermined unit and this is defined as the specified travel distance. Similarly, when data is input from the handle 42, it is regarded that the number of input pulses has specified the travel distance specified in a predetermined unit per pulse and this is defined as the specified travel distance.

The interpolation means 45 and acceleration/deceleration control means 46 exist in the axis movement controller 6 of the NC 1 shown in FIG. 26. The interpolation means 45 finds travel for a single block L from the data transferred from the pre-processing arithmetic means 43 and interpolates the result by the travel distance transferred from the specified travel distance extracting means 44.

An interpolated distribution pulse is subjected to acceleration/deceleration processing by the acceleration/deceleration control means 46 and the result of processing is transmitted to an axis control circuit 47. The axis control circuit 47 converts the distribution pulse into a velocity control signal and sends the result of conversion to a servo amplifier 48. The servo amplifier 48 amplifies the velocity control signal and drives a servo motor 18. The servo motor 18 contains a position detecting pulse coder (not shown) and feeds back a position feedback pulse to the axis control circuit 47. The axis control circuit 47 and the servo amplifier 48 exist in the velocity control unit 17 shown in FIG. 26.

Figure 22:
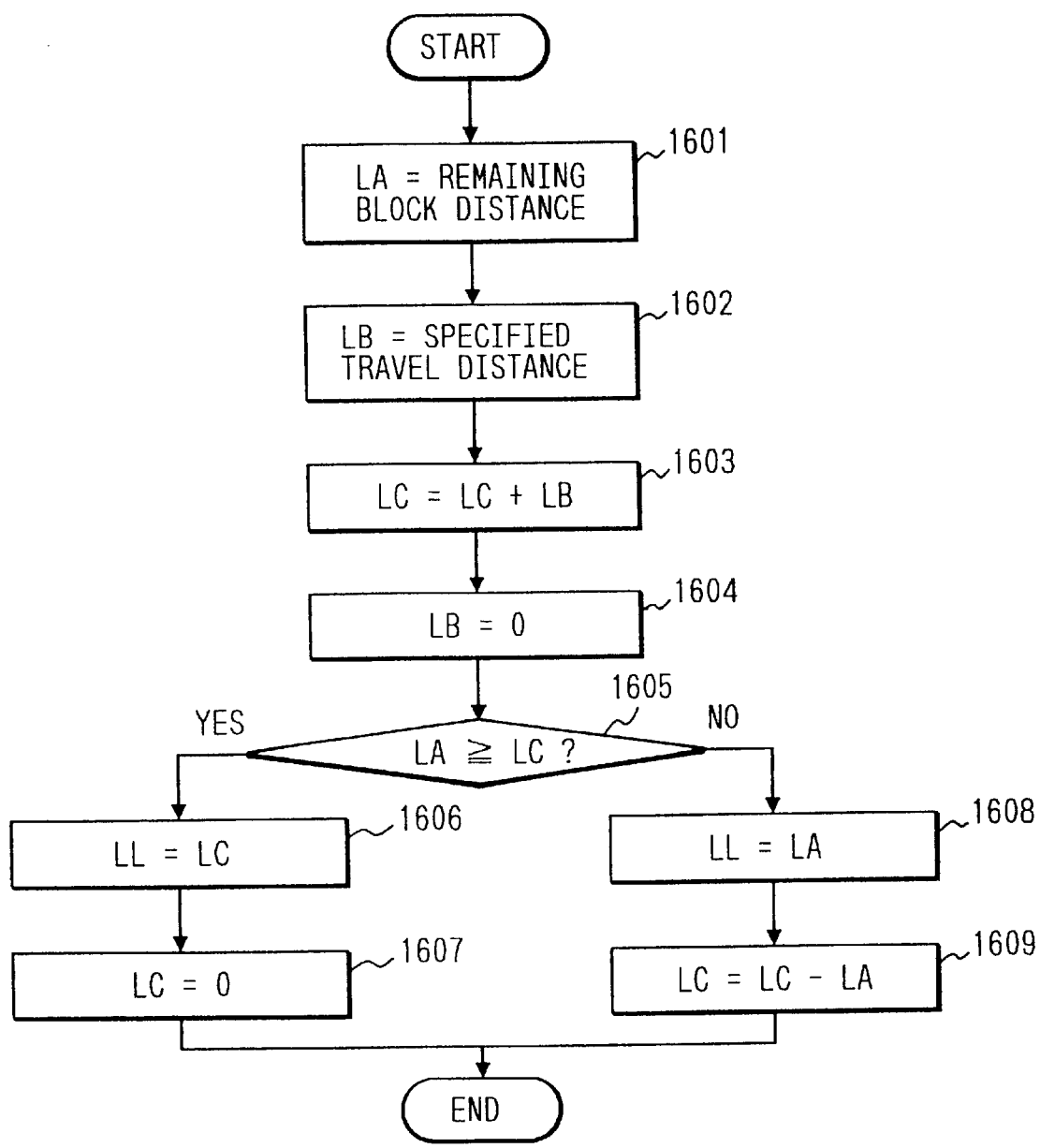
FIG. 22 is a flowchart for interpolation preprocessing in interpolation means.
Figure 24:
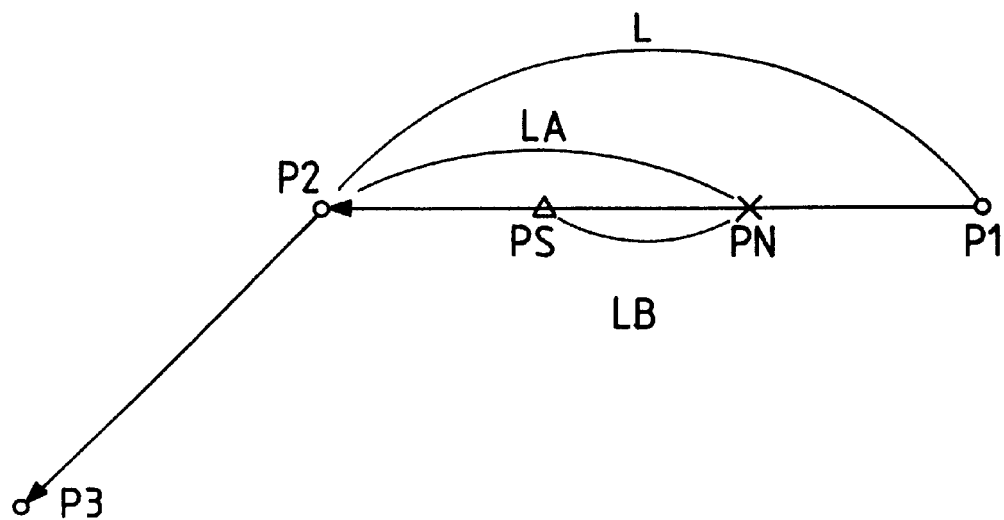
FIG. 24 illustrates processing carried out by the interpolation means.

In FIG. 21, the axis control circuit 47, the servo amplifier 48 and the servo motor 18 are shown for only one axis. Though they are actually required for a plurality of axes, they have been omitted because this applies also to the elements of the other axes. FIG. 22 is a flowchart which illustrates processing performed every time the interpolation means 45 receives data from the specified travel distance extracting means 44. FIG. 24 illustrates processing carried out by the interpolation means 45, wherein L indicates an overall travel distance of a block being executed. If the block for linear movement from point P1 to point P2 is currently being executed, L is the distance between points P1 and P2. Point P3 is the end point of the next block and point PN is a point currently being interpolated.

The remaining distance of the block currently being processed is defined as LA (step 1601) and a travel distance transferred from the specified travel distance extracting means 44 is defined as LB (step 1602). In FIG. 24, LA is the distance between PN and P2 and LB is the distance between PN and PS. Point PS is a point where a stop is effected after the movement of travel distance LB transferred from the specified travel distance extracting means 44.

At this point of time, the sum total of the travel distances transferred from the specified travel distance extracting means 44 is defined as LC and LB is added to LC (step 1603). This processing is performed when the travel command value is transferred from the specified travel distance extracting means 44 again before the movement of travel distance LB transferred from the specified travel distance extracting means 44 is complete. Since travel distance LB transferred from the specified travel distance extracting means 44 has been processed, the value of LB is cleared to zero (step 1604).

Figure 25:
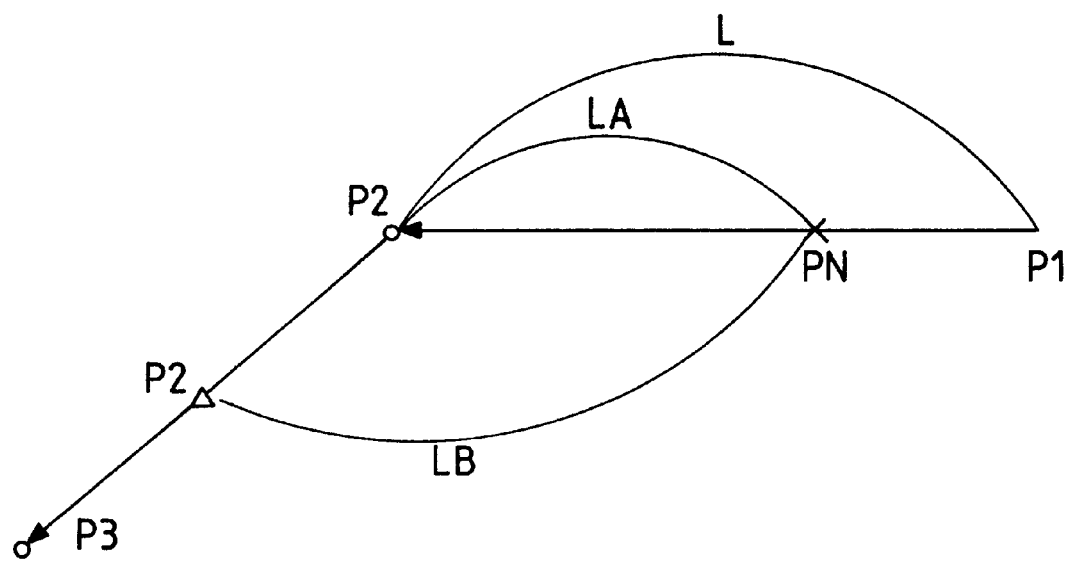
FIG. 25 illustrates processing carried out by the interpolation means.

The remaining distance LA of the block currently being executed is compared with the sum total LC of the specified travel distances, the processing is executed from step 1606 onward if LA is greater, and the processing is executed from step 1608 onward if LA is smaller (step 1605). LA is greater when the block currently being executed has a remaining distance if the movement of specified travel distance LB has been made as shown in FIG. 24. LA is smaller when the remaining distance of the block currently being executed will be exceeded if the movement of specified travel distance LB is performed as shown in FIG. 25.

If LA is larger, remaining distance to be interpolated LL is defined as LC (step 1606) and the value of LC is cleared to zero since the movement of LC has been processed (step 1607). This is done to set distance until stop LL to specified travel distance LC because the movement of the specified overall travel distance must made to effect a stop partway through the block currently being executed.

If LA is smaller, remaining distance to be interpolated LL is defined as LA (step 1608) and LA is subtracted from the value of LC since the processing of movement by LA has been performed (step 1609). This is done to define distance LL as the remaining distance LA of the block currently being executed and to set the value of the remaining specified travel to LC in order to make the movement of the remaining distance of the block currently being executed, since the remaining distance of the block currently being executed will be exceeded if the movement of the specified travel distance is performed.

Figure 23:
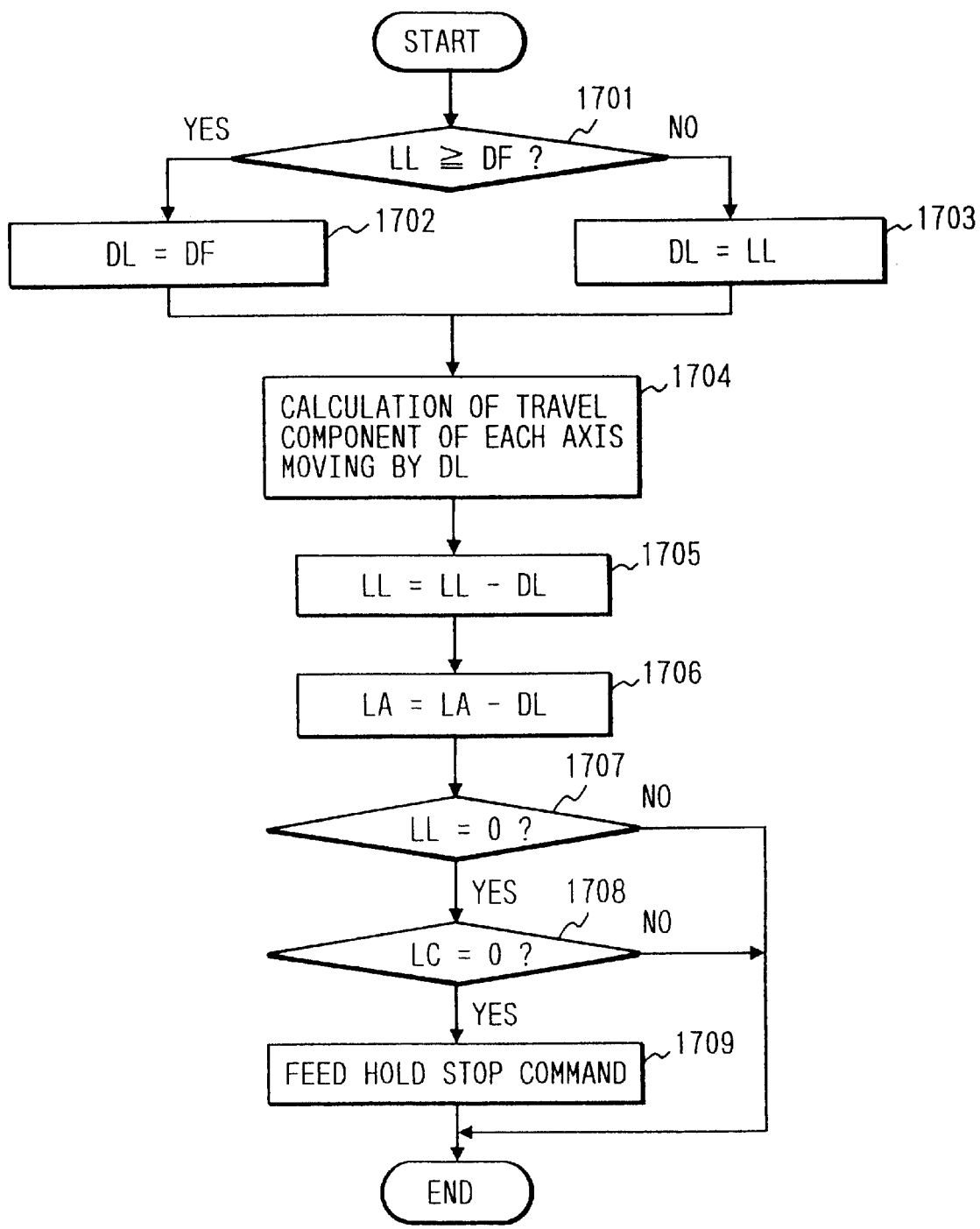
FIG. 23 is a flowchart for interpolation processing in the interpolation means.

FIG. 23 is a flowchart related to interpolation processing carried out by the interpolation means 45. Travel distance LL is compared with travel distance per unit time DF (step 1701). Travel distance per unit time DF is a value which has been obtained by converting the feedrate of a specified tool into a travel to be interpolated per unit time. If LL is larger than DF, travel to be interpolated DL is defined as DF (step 1702). Generally LL is greater than DF. If LL is smaller than DF, travel to be interpolated DL is defined as LL (step 1703). This is the last interpolation among interpolations made for the movement of travel distance LL.

The travel component of each axis which will move by travel distance DL in the block currently being executed is calculated (step 1704). This is similar to the interpolation of CNC made as conventionally. Since the movement of DL has been made, DL is subtracted from travel distance LL (step 1705) and DL is also subtracted from the remaining distance LA of the block currently being executed (step 1706). It is judged whether or not specified travel distance LL has reached zero (step 1707). This judgement is made to determine whether the movement of the specified travel distance is complete or not. If it is zero, it is then judged whether or not LC has reached zero (step 1708). This judgement is made to determine whether the movement of the sum total of the travel distances transferred from the specified travel distance extracting means 44 is complete or not. If it is zero, it is determined that the movement of the sum total of the travel distances transferred from the specified travel distance extracting means 44 is complete and the movement of the tool is stopped to a feed hold status (step 1709).

Subsequently, a cycle, wherein the corresponding movement is made every time the specified travel distance extracting means 44 gives a move command and the tool movement is stopped to the feed hold status again when the movement of the specified travel is complete, is repeated until the machining program being run is terminated.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A numerically controlled machine tool for machining a workpiece via a programmable controller, responsive to a plurality of commands including miscellaneous commands, in accordance with a machining program, comprising:

recognizing means for recognizing a miscellaneous command from a numerical controller being executed by said programmable controller;

storing means for storing the result of said recognition made by said recognizing means;

judging means for judging whether said miscellaneous command is complete or not according to the contents stored in said storing means;

specifying means for specifying a miscellaneous command which need not be completed before a next command is executed;

checking means for checking whether a previously given miscellaneous command from said numerical controller is being executed or not at a time when a next miscellaneous command from said numerical controller is executed;

means for executing said next miscellaneous command after the previously given miscellaneous command is complete if it is being executed; and means for executing the next miscellaneous command without waiting for the completion of the miscellaneous command which need not be completed.

2. The numerically controlled machine tool as defined in claim 1, wherein miscellaneous commands which need not be completed by a completion signal are specifiable in the machining program.

3. A numerically controlled machine tool for machining a workpiece in accordance with a machining program and being operative to execute a plurality of commands including miscellaneous commands, machine tool having a mode in which said machining program is comprising:

prespecifying means for allowing a user, before execution of a test mode and without modifying the machining program, to prespecify a miscellaneous command which is not to be executed during said test mode;

means for determining if said numerically controlled machine tool is in said test mode;

judging means for determining, during said test mode, whether or not a miscellaneous command is the one prespecified by said prespecifying means; and means for disabling, only during said test mode, a specified miscellaneous command from being executed.

4. A numerically controlled machine tool for machining a workpiece in accordance with a machining program and being operative to execute a plurality of commands including miscellaneous commands, said numerically controlled machine tool having a mode in which said machining program is checked, comprising:

lock means for locking miscellaneous commands so as not to be executed;

specifying means for specifying miscellaneous commands which will be executed even in a miscellaneous command lock status in which said specified miscellaneous commands are not executed;

judging means for determining whether or not a miscellaneous command is a specified miscellaneous command when the miscellaneous command is executed during said mode; and means for executing the specified given miscellaneous command even in the miscellaneous command lock status during said mode.

5. A method of operating a numerically controlled machine tool for machining a workpiece via a programmable controller, responsive to a plurality of commands including miscellaneous commands, in accordance with a machining program, comprising:

recognizing a miscellaneous command from a numerical controller being executed by said programmable controller;

storing the result of said recognition;

judging whether said miscellaneous command is complete or not according to the contents stored in said storing step;

specifying a miscellaneous command which need not be completed before a next command is executed;

checking whether a previously given miscellaneous command from said numerical controller is being executed or not at a time when a next miscellaneous command from said numerical controller is executed;

executing said next miscellaneous command after the previously given miscellaneous command is complete if it is being executed; and executing the next miscellaneous command without waiting for the completion of the miscellaneous command which need not be completed.

6. A method of controlling a numerically controlled machine tool for machining a workpiece in accordance with a machining program and being operative to execute a plurality of commands including miscellaneous commands comprising:

prespecifying, before execution of a test mode and without modifying the machining program, a miscellaneous command which is not to be executed during said test mode;

determining if said numerically controlled machine tool is in said test mode;

determining during said test mode, whether or not a miscellaneous command is the one prespecified by said prespecifying step; and disabling, only during said test mode, a prespecified miscellaneous command from being executed.

7. A method of controlling a numerically controlled machine tool for machining a workpiece in accordance with a machining program and being operative to execute a plurality of commands including miscellaneous commands, said numerically controlled machine tool having a mode in which said machining program is checked, comprising:

locking miscellaneous commands so as not to be executed;

specifying miscellaneous commands which will be executed even in a miscellaneous command lock status in which said specified miscellaneous commands are not executed;

determining whether or not a miscellaneous command is said specified miscellaneous command when the miscellaneous command is executed during said mode; and executing the specified given miscellaneous command even in the miscellaneous command lock status during said mode.

8. A method, in a system for controlling a numerically controlled machine tool responsive to a plurality of commands including miscellaneous commands, for classifying miscellaneous commands into groups and checking a status of the system, comprising the steps of:

receiving a miscellaneous command;

determining if the received miscellaneous command has been registered;

determining, after it is determined that the received miscellaneous command has been registered, whether the received miscellaneous command has been assigned to a group;

storing, after it is determined that the received miscellaneous command has been assigned to a group, the received miscellaneous command into a table of the assigned group number; and determining the system status by checking which miscellaneous command value within a particular group has been last executed;

wherein a group is a plurality of miscellaneous commands having a feature in common.

9. The numerically controlled machine tool as defined in claim 4, wherein the specifying means is a user specifying means for allowing a user, without modifying the machining program, to specify the miscellaneous commands.

10. The method of controlling the numerically controlled machine tool as defined in claim 7, wherein a user specifies the miscellaneous commands without modifying the machining program.

* * * * *